(12) United States Patent
Sutardja

(10) Patent No.: US 8,019,482 B2
(45) Date of Patent: Sep. 13, 2011

(54) METHOD AND APPARATUS FOR CONTROLLING A SPRINKLER SYSTEM

(75) Inventor: Sehat Sutardja, Los Altos Hills, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/855,142

(22) Filed: Aug. 12, 2010

(65) Prior Publication Data

US 2010/0305765 A1 Dec. 2, 2010

Related U.S. Application Data

(63) Continuation of application No. 10/692,644, filed on Oct. 24, 2003, now Pat. No. 7,778,736, which is a continuation-in-part of application No. 10/184,302, filed on Jun. 26, 2002, now Pat. No. 7,457,676, which is a continuation-in-part of application No. 10/184,505, filed on Jun. 26, 2002, now Pat. No. 7,546,172, which is a continuation-in-part of application No. 10/184,299, filed on Jun. 26, 2002, now Pat. No. 7,315,764, which is a continuation-in-part of application No. 09/659,693, filed on Sep. 11, 2000.

(60) Provisional application No. 60/211,874, filed on Jun. 14, 2000.

(51) Int. Cl.
*G06F 19/00* (2006.01)

(52) U.S. Cl. .......... 700/284; 700/276; 700/282; 239/63; 239/551; 239/562

(58) Field of Classification Search .......... 700/276, 700/282, 284; 239/63, 551, 562
See application file for complete search history.

(56) References Cited

U.S. PATENT DOCUMENTS

| 3,878,514 | A | 4/1975 | Faber |
| 3,925,763 | A | 12/1975 | Wadhwani et al. |
| 4,215,408 | A | 7/1980 | Games et al. ............. 700/278 |
| 4,755,792 | A | 7/1988 | Pezzolo et al. |

(Continued)

FOREIGN PATENT DOCUMENTS

EP 0 982 732 A1 3/2000

(Continued)

OTHER PUBLICATIONS

IEEE P802.11i/D10.0, Apr. 2004 (Amendment to ANSI/IEEE Std 802.11-1999 (2003 Reaff) edition as amended by IEEE Std 802.11g-2003 and IEEE Std 802.11h-2003); IEEE Standard for Information technology—Telecommunications and information exchange between systems—Local and metropolitan area networks—Specific requirements; Part 11: Wireless Medium Access Control (MAC) and Physical Layer (PHY) specifications: Amendment 6: Medium Access Control (MAC) Security Enhancements; LAN/MAN Committee of the IEEE Computer Society; 184 pages.

(Continued)

*Primary Examiner* — Michael D Masinick

(57) ABSTRACT

A sprinkler system having a method and computer program comprises one or more sprinklers each comprising a sprinkler valve adapted to regulate an amount of fluid delivered by the sprinkler in response to a control signal; a master unit adapted to transmit digital data; and a sprinkler controller comprising a receiver adapted to receive a signal representing the digital data; a media access controller adapted to obtain the digital data from the signal; and a processor adapted to produce the control signal based on the digital data obtained by the media access controller; and an output circuit adapted to provide the control signal to the sprinklers.

6 Claims, 29 Drawing Sheets

U.S. PATENT DOCUMENTS

| | | | |
|---|---|---|---|
| 4,760,547 A | 7/1988 | Duxbury | |
| 4,821,027 A | 4/1989 | Mallory et al. | |
| 4,897,630 A | 1/1990 | Nykerk | |
| 5,038,268 A | 8/1991 | Krause et al. | 700/16 |
| 5,083,122 A | 1/1992 | Clark | |
| 5,148,546 A | 9/1992 | Blodgett | |
| 5,173,855 A | 12/1992 | Nielsen et al. | |
| 5,479,151 A | 12/1995 | Lavelle et al. | |
| 5,511,000 A | 4/1996 | Kaloi et al. | |
| 5,552,766 A | 9/1996 | Lee et al. | |
| 5,682,142 A | 10/1997 | Loosmore et al. | |
| 5,686,885 A | 11/1997 | Bergman | |
| 5,687,325 A | 11/1997 | Chang | |
| 5,696,671 A * | 12/1997 | Oliver | 700/284 |
| 5,724,475 A | 3/1998 | Kirsten | |
| 5,727,231 A | 3/1998 | Bartley et al. | |
| 5,771,174 A | 6/1998 | Spinner et al. | |
| 5,802,463 A * | 9/1998 | Zuckerman | 455/208 |
| 5,818,389 A | 10/1998 | Lazar | |
| 5,825,202 A | 10/1998 | Tavana et al. | |
| 5,880,775 A | 3/1999 | Ross | |
| 5,903,871 A | 5/1999 | Terui et al. | |
| 5,917,405 A | 6/1999 | Joao | |
| 6,011,666 A | 1/2000 | Wakamatsu | |
| 6,061,306 A | 5/2000 | Buchheim | |
| 6,111,580 A | 8/2000 | Kazama et al. | |
| 6,118,269 A | 9/2000 | Davis | |
| 6,119,091 A | 9/2000 | Huang et al. | |
| 6,181,994 B1 | 1/2001 | Colson et al. | |
| 6,192,340 B1 | 2/2001 | Abecassis | |
| 6,208,263 B1 | 3/2001 | Strand | |
| 6,225,901 B1 | 5/2001 | Kail, IV | |
| 6,233,393 B1 | 5/2001 | Yanagihara et al. | |
| 6,247,130 B1 | 6/2001 | Fritsch | |
| 6,271,752 B1 | 8/2001 | Vaios | |
| 6,281,790 B1 | 8/2001 | Kimmel et al. | |
| 6,282,714 B1 | 8/2001 | Ghori et al. | |
| 6,289,099 B1 | 9/2001 | Edgar, III | |
| 6,292,108 B1 | 9/2001 | Straser et al. | |
| 6,308,253 B1 | 10/2001 | Gadre et al. | |
| 6,332,175 B1 | 12/2001 | Birrell et al. | |
| 6,334,025 B1 | 12/2001 | Yamagami | |
| 6,370,448 B1 | 4/2002 | Eryurek | |
| 6,389,423 B1 | 5/2002 | Sakakura | |
| 6,393,430 B1 | 5/2002 | Van Ryzin | |
| 6,441,731 B1 | 8/2002 | Hess | |
| 6,449,708 B2 | 9/2002 | Dewhurst et al. | |
| 6,476,858 B1 | 11/2002 | Ramirez Diaz et al. | |
| 6,496,692 B1 | 12/2002 | Shanahan | |
| 6,502,194 B1 | 12/2002 | Berman et al. | |
| 6,516,039 B1 | 2/2003 | Taura et al. | |
| 6,553,404 B2 | 4/2003 | Stern | |
| 6,585,168 B1 | 7/2003 | Caprio | 236/44 A |
| 6,594,272 B1 | 7/2003 | Ketcham et al. | |
| 6,603,808 B1 | 8/2003 | Anne et al. | 375/222 |
| 6,618,812 B2 | 9/2003 | Seller et al. | |
| 6,624,750 B1 | 9/2003 | Marman et al. | |
| 6,671,343 B1 | 12/2003 | Ito | |
| 6,690,411 B2 | 2/2004 | Naidoo et al. | |
| 6,697,103 B1 | 2/2004 | Fernandez et al. | |
| 6,727,811 B1 | 4/2004 | Fendis | |
| 6,763,182 B1 | 7/2004 | Endo et al. | |
| 6,772,212 B1 | 8/2004 | Lau et al. | |
| 6,859,831 B1 | 2/2005 | Gelvin et al. | |
| 6,867,683 B2 | 3/2005 | Calvesio et al. | |
| 6,950,946 B1 | 9/2005 | Droz et al. | |
| 6,970,081 B1 | 11/2005 | Cheng | |
| 6,975,220 B1 | 12/2005 | Foodman et al. | |
| 7,081,813 B2 | 7/2006 | Winick et al. | |
| 7,171,281 B2 | 1/2007 | Weber et al. | |
| 7,216,659 B2 * | 5/2007 | Caamano et al. | 137/1 |
| 7,242,294 B2 | 7/2007 | Warrior et al. | |
| 7,298,252 B1 | 11/2007 | Sutardja et al. | |
| 7,315,764 B1 | 1/2008 | Sutardja et al. | |
| 7,342,504 B2 | 3/2008 | Crane et al. | |
| 7,444,439 B2 | 10/2008 | Du et al. | |
| 7,457,676 B1 | 11/2008 | Sutardja et al. | |
| 7,522,039 B2 | 4/2009 | Sutardja et al. | |
| 7,546,172 B1 | 6/2009 | Sutardja et al. | |
| 7,577,247 B1 | 8/2009 | Sutardja | |
| 7,789,321 B2 * | 9/2010 | Hitt | 239/63 |
| 2001/0030660 A1 | 10/2001 | Zainoulline | |
| 2002/0002425 A1 | 1/2002 | Dossey et al. | |
| 2002/0019925 A1 | 2/2002 | Dewhurst et al. | |
| 2002/0019984 A1 | 2/2002 | Rakib | |
| 2002/0041692 A1 | 4/2002 | Seto et al. | |
| 2002/0154029 A1 * | 10/2002 | Watters et al. | 340/870.07 |
| 2002/0167590 A1 | 11/2002 | Naidoo et al. | |
| 2003/0120393 A1 | 6/2003 | Bailey et al. | |
| 2005/0125083 A1 | 6/2005 | Kiko | |
| 2005/0128068 A1 | 6/2005 | Winick et al. | |
| 2006/0181425 A1 | 8/2006 | Crane et al. | |
| 2011/0042480 A1 * | 2/2011 | Hitt | 239/63 |

FOREIGN PATENT DOCUMENTS

| | | |
|---|---|---|
| EP | 0 999 549 A2 | 5/2000 |
| WO | WO 99/48296 A1 | 9/1999 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless Lan Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor Jan. 2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 24 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems —Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h—2003 (Amendment to IEEE Std 802.11, 1999 Edition (Reaff 2003)); as amended by IEEE Stds 802.11a-1999, 802.11b-1999, 802.11b-1999/Cor Jan. 2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY)

specifications Amendment 5: Spectrum and Transmit Power Management Extensions in the 5 GHz band in Europe; IEEE Computer Society LAN/MAN Standards Committee; Oct. 14, 2003; 74 pages.

Settles, Curtis; DSP-Augmented CPU cores Promise Performance Boost for Ultra-Compact Drives, Data Storage, May 2000, pp. 35-38, PennWell, US.

Quantum, Part 2: A Closer Look at Hard Disk Drives; Chapter 3: Inside Hard Disk Drives, Quantum Online, Jun. 7, 2000, pp. 1-3, Quantum, US.

Quantum, Chapter 4: Recent Technological Developments: The Impact of Leading-Edge Technology on Mass Storage, Quantum Online, Jun. 7, 2000, pp. 1-3, Quantum, US.

Atmel Announces 802.11b Media Access Controller (MAS) with Integrated Baseband for Wireless Applications, Design & Reuse, Aug. 21, 2002.

* cited by examiner

METHOD AND APPARATUS FOR CONTROLLING A SPRINKLER SYSTEM

CROSS-REFERENCE TO RELATED APPLICATIONS

This application is a continuation of U.S. patent application Ser. No. 10/692,644 (now U.S. Pat. No. 7,778,736), filed on Oct. 24, 2003, which is a continuation-in-part of U.S. patent application Ser. No. 10/184,302 (now U.S. Pat. No. 7,457,676), filed on Jun. 26, 2002, which is a continuation-in-part of U.S. patent application Ser. No. 10/184,505 (now U.S. Pat. No. 7,546,172), filed on Jun. 26, 2002, which is a continuation-in-part of U.S. patent application Ser. No. 10/184,299 (now U.S. Pat. No. 7,315,764), filed on Jun. 26, 2002, which is a continuation-in-part of U.S. patent application Ser. No. 09/659,693, filed on Sep. 11, 2000, which claims the benefit of U.S. Provisional Patent Application No. 60/211,874, filed on Jun. 14, 2000, the disclosures therof incorporated by reference herein in their entirety.

BACKGROUND

The present invention relates generally to an apparatus for environmental control.

FIG. 1 is an example of a conventional MP3 player. MP3 player includes an interface 106, nonvolatile solid state memory 102, a decoder 110, a digital-to-analog (D/A) converter 147, an audio output 116, a key pad 108, a display 112, a controller 104, RAM 144 and ROM 145.

Controller 104 controls the operation of the MP3 player in accordance with a set of programmed instructions. Programmed instructions for controller 104 are stored in nonvolatile memory or ROM 145, and RAM 144 is provided as the working memory for controller 104.

Typically, MP3 data, which is a digital compressed format representing music data, is initially stored on a personal computer 50 and is subsequently transferred to the MP3 player via interface 106, under control of controller 104. The MP3 data is stored in nonvolatile solid state memory 102. Interface 50 can implemented by a standard parallel port, serial port, USB and the like. Nonvolatile solid state memory 102 may be implemented as flash memory. Generally, for a music quality recording, a nonvolatile solid state memory having 64 Mbytes can store about 1 hour of music. Flash memory provides the capability of retaining the stored digital data even when the MP3 player is powered down. Once the digital data has been transferred to the MP3 player, it no longer needs to be connected to personal computer 50, and the MP3 player can play back the MP3 data autonomously from personal computer 50.

Decoder 110 functions to decode and decompress the MP3 data file stored in nonvolatile solid state memory 102. Decoder 110 decompresses the MP3 music file in accordance controller 104 according to the MP3 format, and decodes the decompressed music file into a bit stream form. The bit stream is then converted into analog form by digital to analog converter 147 for connection to a speaker, earphone and the like. A decoding program for the MP3 decoder function is stored in the ROM 145 and loaded to RAM 144 by controller 104 as required.

The MP3 player comprises a keypad 108 for allowing user control and interaction with the MP3 player. Such control may include power on/power off, music selection and volume. The MP3 also comprises a display 112 for displaying characters or graphics, such as a battery indicator, a play mode indicator, a volume indicator, available memory size and the title of the music being played.

SUMMARY

In general, in one aspect, the invention features a sprinkler system comprising one or more sprinklers each comprising a sprinkler valve adapted to regulate an amount of fluid delivered by the sprinkler in response to a control signal; a master unit adapted to transmit digital data; and a sprinkler controller comprising a receiver adapted to receive a signal representing the digital data; a media access controller adapted to obtain the digital data from the signal; and a processor adapted to produce the control signal based on the digital data obtained by the media access controller; and an output circuit adapted to provide the control signal to the sprinklers.

Particular implementations can include one or more of the following features. The digital data comprises data representing at least one of the group comprising a desired sprinkler operation schedule; meteorological conditions; and a status of a fluid supply system supplying the fluid to the sprinklers. The sprinkler controller further comprises a timer adapted to provide a time signal representing a time of day; wherein the processor is adapted to provide the control signal based on the digital data obtained by the media access controller and the time signal. The receiver is further adapted to receive a sensor signal provided by one or more sensors; and the processor is further adapted to provide the control signal based on the digital data obtained by the media access controller and the sensor signal. The sensor signal represents at least one of the group comprising a pressure of the fluid, a flow rate of the fluid, a sunlight intensity, an ambient temperature, and a relative humidity. The sprinkler system further comprises the one or more sensors. The sprinkler controller further comprises a keypad adapted to provide a keypad control signal in response to operation of the keypad; wherein the processor is further adapted to provide the control signal based on the digital data obtained by the media access controller and the keypad control signal. The sprinkler controller further comprises a display adapted to display a status of the sprinkler controller. The processor and the media access controller are implemented together as a single integrated circuit. The receiver is a wireless receiver. The receiver complies with a standard selected from the group consisting of IEEE 802.11; IEEE 802.11a; IEEE 802.11b; IEEE 802.11g; IEEE 802.11h; IEEE 802.11i; Short Messaging Service (SMS); and Analog Display Service Interface (ADSI). The sprinkler controller further comprises a memory adapted to store a sprinkler schedule; and the processor is further adapted to produce the control signal based on the sprinkler schedule. The processor is further adapted to produce the control signal based on the sprinkler schedule stored in the memory when the signal representing the digital data is unavailable. The memory is non-volatile. The receiver comprises pager technology.

In general, in one aspect, the invention features a sprinkler controller for controlling one or more sprinklers each comprising a sprinkler valve adapted to regulate an amount of fluid delivered by the sprinkler in response to a control signal, the sprinkler controller comprising a receiver adapted to receive a signal representing digital data; a media access controller adapted to obtain the digital data from the signal; and a processor adapted produce the control signal based on the digital data obtained by the media access controller; and an output circuit adapted to provide the control signal to the sprinklers.

Particular implementations can include one or more of the following features. The digital data comprises data representing at least one of the group comprising a desired sprinkler operation schedule; meteorological conditions; and a status of a fluid supply system supplying the fluid to the sprinklers. The sprinkler controller further comprises a timer adapted to provide a time signal representing a time of day; wherein the processor is adapted to provide the control signal based on the digital data obtained by the media access controller and the time signal. The receiver is further adapted to receive a sensor signal provided by one or more sensors; and wherein the processor is further adapted to provide the control signal based on the digital data obtained by the media access controller and the sensor signal. The sensor signal represents at least one of the group comprising a pressure of the fluid, a flow rate of the fluid, a sunlight intensity, an ambient temperature, and a relative humidity. The sprinkler controller further comprises the one or more sensors. The sprinkler controller further comprises a keypad adapted to provide a keypad control signal in response to operation of the keypad; the processor is further adapted to provide the control signal based on the digital data obtained by the media access controller and the keypad control signal. The sprinkler controller further comprises a display adapted to display a status of the sprinkler controller. The processor and the media access controller are implemented together as a single integrated circuit. The receiver is a wireless receiver. The receiver complies with a standard selected from the group consisting of IEEE 802.11; IEEE 802.11a; IEEE 802.11b; IEEE 802.11g; IEEE 802.11h; IEEE 802.11i; Short Messaging Service (SMS); and Analog Display Service Interface (ADSI). The sprinkler controller further comprises a memory adapted to store a sprinkler schedule; and wherein the processor is further adapted to produce the control signal based on the sprinkler schedule. The processor is further adapted to produce the control signal based on the sprinkler schedule stored in the memory when the signal representing the digital data is unavailable. The memory is non-volatile. The receiver comprises pager technology.

In general, in one aspect, the invention features a method and computer program for controlling one or more sprinklers each comprising a sprinkler valve adapted to regulate an amount of fluid delivered by the sprinkler in response to a control signal, the method comprising receiving a signal representing digital data; obtaining the digital data from the signal; decoding the digital data; and providing a control signal to the sprinklers based on the digital data.

Particular implementations can include one or more of the following features. The digital data comprises data representing at least one of the group comprising a desired sprinkler operation schedule; meteorological conditions; and a status of a fluid supply system supplying the fluid to the sprinklers. The method further comprises providing a time signal representing a time of day; and providing the control signal based on the digital data and the time signal. The method further comprises receiving a sensor signal; and providing the control signal based on the data and the sensor signal. The sensor signal represents at least one of the group comprising a pressure of the fluid, a flow rate of the fluid, a sunlight intensity, an ambient temperature, and a relative humidity. The method further comprises receiving a keypad control signal representing operation of a keypad; and providing the control signal based on the digital data and the keypad control signal. The method further comprises displaying a status of the sprinkler controller. The method further comprises storing a sprinkler schedule; and wherein control signal is based on the sprinkler schedule. The method of claim further comprises producing the control signal based on the stored sprinkler schedule when the signal representing the digital data is unavailable.

In general, in one aspect, the invention features an integrated circuit to control a sprinkler controller for controlling one or more sprinklers each comprising a sprinkler valve adapted to regulate the amount of fluid delivered by the sprinkler in response to a control signal, wherein the sprinkler controller comprises a receiver adapted to receive a signal representing digital data and an output circuit adapted to provide the control signal to the sprinklers in response to a control signal, the integrated circuit comprising a media access controller adapted to obtain digital data from a signal received by a receiver of the sprinkler controller, the signal representing the digital data, and a processor adapted to produce the control signal based on the digital data obtained by the media access controller.

Particular implementations can include one or more of the following features. The digital data comprises data representing at least one of the group comprising a desired sprinkler operation schedule; meteorological conditions; and a status of a fluid supply system supplying the fluid to the sprinklers. The sprinkler controller further comprises a sensor adapted to provide a sensor signal provided by one or more sensors; wherein the processor is adapted to provide the control signal based on the digital data obtained by the media access controller and the sensor signal. The sensor signal represents at least one of the group comprising a pressure of the fluid, a flow rate of the fluid, sunlight intensity; an ambient temperature; and a relative humidity. The sprinkler controller further comprises a timer adapted to provide a time signal representing a time of day; wherein the processor is adapted to provide the control signal based on the digital data obtained by the media access controller and the time signal. The integrated circuit of claim further comprises a memory adapted to store a sprinkler schedule; wherein the processor is further adapted to produce the control signal based on the sprinkler schedule. The processor is further adapted to produce the control signal based on the sprinkler schedule stored in the memory when the signal representing the digital data is unavailable. The memory is non-volatile.

In general, in one aspect, the invention features a method and computer-implemented method for serving a sprinkler system comprising one or more sprinklers and a sprinkler controller adapted to control the sprinklers, the method comprising obtaining sprinkler-related data; generating a schedule for the sprinkler system based on the sprinkler-related data; and transmitting the sprinkler schedule to the sprinkler controller; wherein the sprinkler controller controls the sprinklers according to the sprinkler schedule.

Particular implementations can include one or more of the following features. The sprinkler-related data is selected from the group consisting of meteorological conditions; and a status of a fluid supply system supplying fluid to the sprinklers. The sprinkler system further comprises one or more sensors, and the method further comprises receiving a sensor signal from one or more of the sensors, the sensor signal representing a condition of the sprinkler system; and generating the schedule for the sprinkler system based on the sprinkler-related data and the sensor signal. The method further comprises determining a condition of the sprinkler system based on the sensor signal; determining a service for the sprinkler system in accordance with the condition of the sprinkler system; and providing the service for the sprinkler system. The sensor signal represents at least one of the group comprising a pressure of a fluid supplied to the sprinklers; and a flow rate of the fluid. The service for the sprinkler system is selected from the group consisting of interrupting a flow of fluid supplied to the sprinkler system; repairing one or more of the sprinklers; and repairing supply line providing fluid to one or more of the sprinklers. Implementations comprise determining a cost of the service provided for the sprinkler system; generating an invoice for the cost of the service; and providing the invoice to a custodian of the sprinkler system.

In general, in one aspect, the invention features an environmental control system comprising an environmental control unit adapted to control one or more environmental variables in response to a control signal; a master unit adapted to transmit digital data; and a controller comprising a receiver adapted to receive a signal representing the digital data; a media access controller adapted to obtain the digital data from the signal, and a processor adapted to produce the control signal based on the digital data obtained by the media access controller; and an output circuit adapted to provide the control signal to the environmental control unit.

Particular implementations can include one or more of the following features. The digital data comprises data representing at least one of the group comprising a desired ambient temperature; and meteorological conditions. The receiver is further adapted to receive a sensor signal provided by one or more sensors; and the processor is further adapted to provide the control signal based on the digital data obtained by the media access controller and the sensor signal. The sensor signal represents at least one of the group comprising a pressure of the fluid, a flow rate of the fluid, a sunlight intensity, an ambient temperature, and a relative humidity. The environmental control system further comprises the one or more sensors. The controller further comprises a keypad adapted to provide a keypad control signal in response to operation of the keypad; wherein the processor is adapted to provide the control signal based on the digital data obtained by the media access controller and the keypad control signal. The controller further comprises a display adapted to display a status of the controller. The processor and the media access controller are implemented together as a single integrated circuit. The receiver is a wireless receiver. The receiver complies with a standard selected from the group consisting of IEEE 802.11; IEEE 802.11a; IEEE 802.11b; IEEE 802.11g; IEEE 802.11h; IEEE 802.11i; Short Messaging Service (SMS); and Analog Display Service Interface (ADSI). The controller further comprises a memory adapted to store a schedule; and wherein the processor is further adapted to produce the control signal based on the schedule. The processor is further adapted to produce the control signal based on the schedule stored in the memory when the signal representing the digital data is unavailable. The memory is non-volatile. The receiver comprises pager technology.

In general, in one aspect, the invention features a controller for controlling an environmental control unit, the controller comprising a receiver adapted to receive a signal representing digital data; a media access controller adapted to obtain the digital data from the signal; and a processor adapted to produce a control signal based on the digital data obtained by the media access controller; and an output circuit adapted to provide the control signal to the environmental control unit.

Particular implementations can include one or more of the following features. The digital data comprises data representing at least one of the group comprising a desired ambient temperature; and meteorological conditions. The receiver is further adapted to receive a sensor signal provided by one or more sensors in response to environmental conditions; and the processor is further adapted to provide the control signal based on the digital data obtained by the media access controller and the sensor signal. The sensor signal represents at least one of the group comprising a sunlight intensity, an ambient temperature, and a relative humidity. The controller further comprises the one or more sensors. The controller further comprises a keypad adapted to provide a keypad control signal in response to operation of the keypad; wherein the processor is adapted to provide the control signal based on the digital data obtained by the media access controller and the keypad control signal. The controller further comprises a display adapted to display a status of the controller. A thermostat comprises the controller. The processor and the media access controller are implemented together as a single integrated circuit. The receiver is a wireless receiver. The receiver complies with a standard selected from the group consisting of IEEE 802.11; IEEE 802.11a; IEEE 802.11b; IEEE 802.11g; IEEE 802.11h; IEEE 802.11i; Short Messaging Service (SMS); and Analog Display Service Interface (ADSI). The controller further comprises a memory adapted to store a schedule; and wherein the processor is further adapted to produce the control signal based on the schedule. The processor is further adapted to produce the control signal based on the schedule stored in the memory when the signal representing the digital data is unavailable. The memory is non-volatile. The receiver comprises pager technology.

In general, in one aspect, the invention features a method and computer program for controlling an environmental control unit, the method comprising receiving a signal representing digital data; obtaining the digital data from the signal; and providing a control signal to the environmental control unit based on the digital data.

Particular implementations can include one or more of the following features The digital data comprises data representing at least one of the group comprising a desired ambient temperature; and meteorological conditions. The method further comprises receiving a sensor signal provided by one or more sensors in response to environmental conditions; and providing the control signal based on the digital data and the sensor signal. The sensor signal represents at least one of the group comprising a sunlight intensity, an ambient temperature, and a relative humidity. The method further comprises receiving a keypad control signal representing operation of a keypad; and providing the control signal based on the digital data and the keypad control signal. The method further comprises displaying a status of the sprinkler controller. The method further comprising storing a schedule; and wherein control signal is based on the schedule. The method further comprises producing the control signal based on the stored schedule when the signal representing the digital data is unavailable.

In general, in one aspect, the invention features an integrated circuit to control a controller for controlling an environmental control unit, the integrated circuit comprising a media access controller adapted to obtain digital data from a signal received by a receiver of the controller, the signal representing the digital data; and a processor adapted to produce a control signal based on the digital data obtained by the media access controller; wherein the controller provides the control signal to the environmental control unit.

Particular implementations can include one or more of the following features. The sensor signal represents at least one of the group comprising sunlight intensity; an ambient temperature; and a relative humidity. The integrated circuit further comprises a display, wherein the processor causes the display to display a status of the controller. The digital data comprises data representing at least one of the group comprising a desired ambient temperature; and meteorological conditions. The integrated circuit further comprises a memory adapted to store a schedule; and wherein the processor is further adapted to produce the control signal based on the schedule. The processor is further adapted to produce the control signal based on the schedule stored in the memory when the signal representing the digital data is unavailable. The memory is non-volatile.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears. Like reference numerals refer to like parts.

DETAILED DESCRIPTION

Embodiments of the present invention are directed to an apparatus for environmental control using digital data transmitted to the apparatus. The digital data can be encoded, compressed or both, and can be transmitted wirelessly or by wire, cable, or the like.

While implementation of the present invention are discussed in terms of data compression such as MP3, the invention is not limited to data compression, but includes other forms of data encoding that may or may not include data compression. In implementations where the data encoding includes data compression, the media data is encoded by a process that compresses the media data, and the encoded media data is decoded by a process that decompresses the encoded media data.

Figure 1:
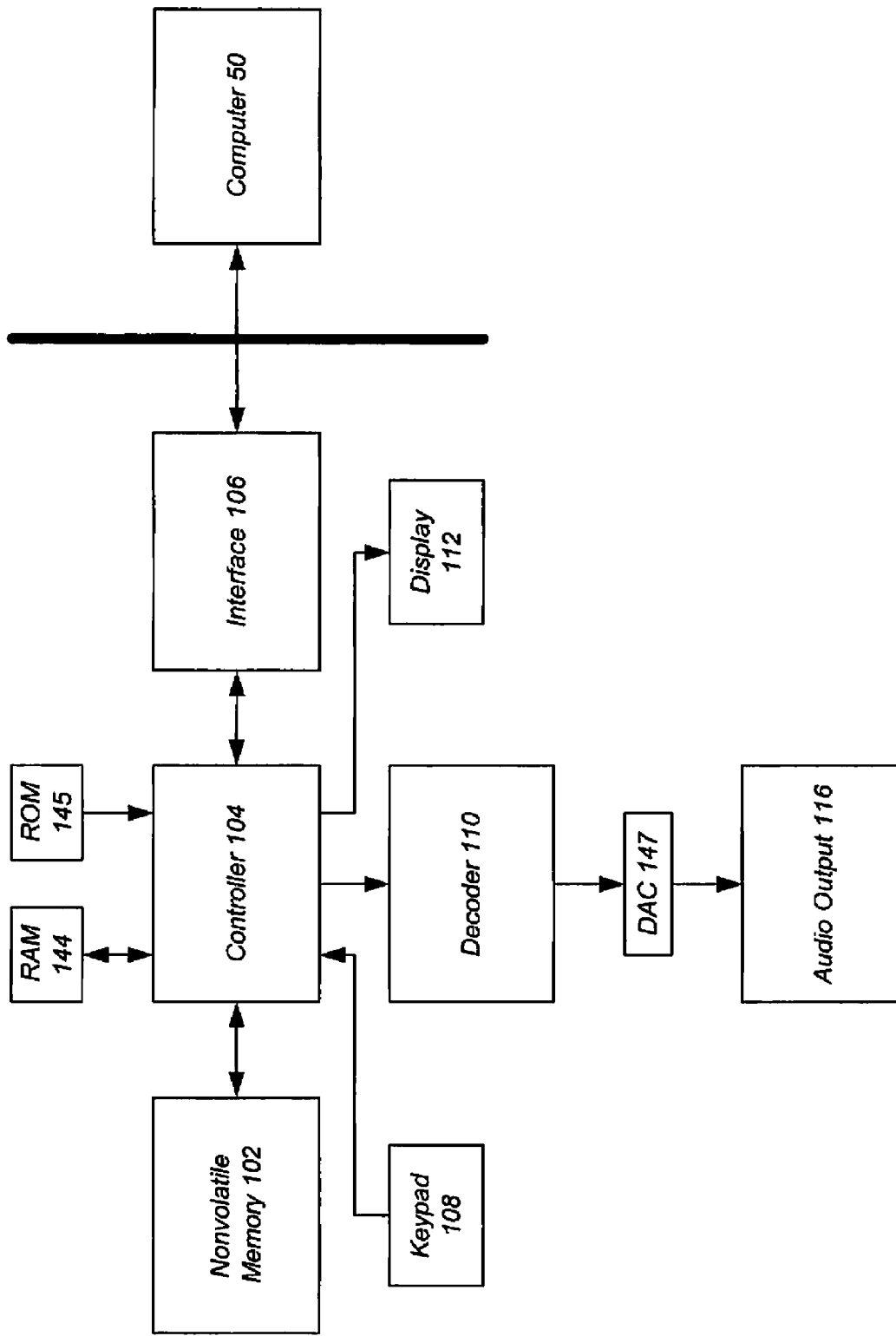
FIG. 1 is a block diagram of a conventional MP3 player.
Figure 2:
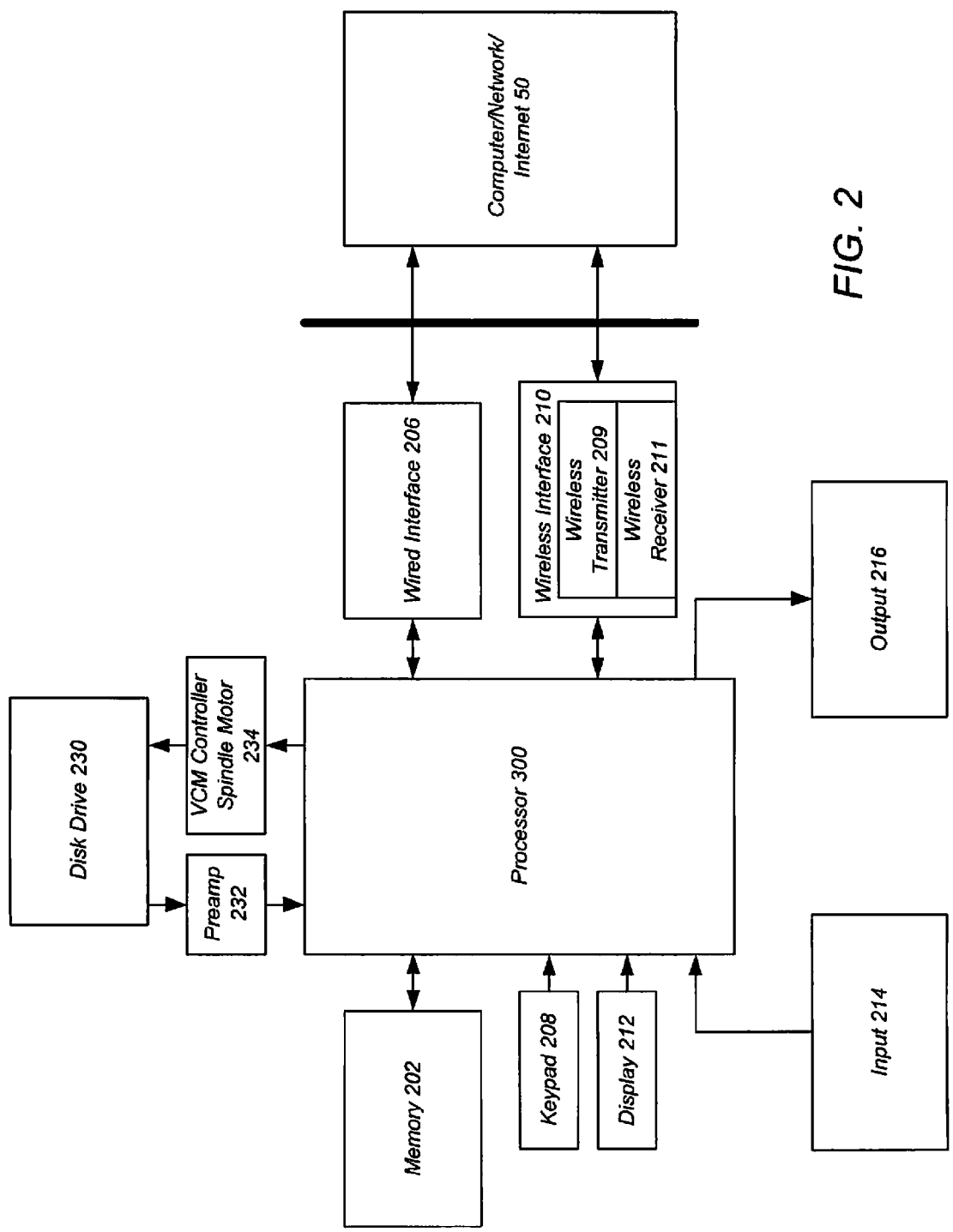
FIG. 2 is a block diagram of a first embodiment of a media player/recorder in accordance with the present invention.

Referring to FIG. 2 there is shown the first embodiment of media player/recorder of the present invention. The media player/recorder includes a wired interface 206, a wireless interface 210, memory 202, a processor 300, an output 216, a keypad 208, a display 212, a storage device (the storage device may utilize, for example, a magnetic media (such as a hard disk drive), magneto-optical media, an optical media (such as a CD ROM, CDR, CDRW or the like), and the like) such as, a disk drive 230, a preamp 232 and a voice coil motor (VCM) 234. Wireless interface 210 includes a wireless transmitter 209 and a wireless receiver 211.

The operation of the media player/recorder is as follows. Operation of the media player/recorder is controlled by the user through keypad 208. Status of the media player/recorder is provided to the user by display 212.

Media data, which was previously digitized, may be obtained (downloaded) from a personal computer, network appliance, local area network, Internet 50 and the like, including wireless networks with infrastructure, such as a designated access point, peer-to-peer wireless networks, and the like. Such external devices communicate with the media player/recorder via wired interface 206 and wireless interface 210, which are controlled by processor 300. Wired interface 206 may be implemented, for example, as a parallel interface, serial interface, USB, Ethernet connection, IEEE 1394 (a.k.a. Firewire), and the like. Wireless interface 210 may be implemented, for example, as an infrared interface, IEEE 802.15, IEEE 802.11, Bluetooth™ and the like. Again the present invention is independent of the interface selected. Media data is then stored on the storage device such as, disk drive 230 in accordance with processor 300. Disk drive 230 is preferably a miniature drive with a capacity of 1 Gbyte of data storage, which is particularly suitable for a portable device. Of course, any other appropriate sized disk drive may be employed.

Alternatively, media data may be obtained directly from an external analog source, such as a microphone or video camera, connected to input 214. Input 214 takes the input signal from external device and sets the analog signal to an appropriate level. The analog signal is then converted to a digital signal and compressed using a selected format by processor 300, as will be described herein below. The compressed digital data is similarly stored on disk drive 230.

When the user chooses a selection of media data to be played back with keypad 208, processor 300 powers up disk drive 230 and retrieves the selected data which is then transferred to memory 202. It is noted that the powering up of the device is done in a sequential manner so as to minimize energy consumption of the device. A more detailed description is provided below.

Memory 202 comprises a solid state memory, such as, for example dynamic random access memory (solid state memory), flash memory, EEPROM, or the like. It is not necessary for memory 202 to be nonvolatile since the media data is stored in a nonvolatile manner on storage device or disk drive 230. The quantity of solid state memory required is less than is required in a conventional MP3 player. The quantity of solid state memory contemplate is about 2 Mbytes, which is sufficient to store about 2 minutes of MP3 data. Of course, as will be appreciated by one of ordinary skill in the art, when dealing with video data, more solid state memory may be required. The amount of solid state memory supplied is selected to minimize energy consumption.

After the selected data is stored in memory 202, disk drive 230 is then powered down. In this manner, during playback disk drive 230 is powered up only during the transfer of the selected media data from disk drive 230 to memory 202, which results in lower energy consumption. A more detailed description of the powering down of disk drive 230 is provided herein below. The media data is retrieved from memory 202. Processor 300 determines the format of data compression from the retrieved data. Disk drive 230, also stores the data compression/decompression algorithms. The data is decompressed in accordance with the determined format and converted to an analog signal by processor 300. The analog signal is set to an appropriate level by output circuit 216. If the analog signal contains audio data, output circuit 216 is connected to a speaker, headphone and the like for playback, and if the analog signal contains video data, output circuit 216 is connected to a display device for playback.

Additionally, media data recorded on disk drive 230 or stored in memory 202 may be transferred (uploaded) to a personal computer, network appliance, local area network, internet 50 or another media player/recorder through interfaces 206 and 210 under the control of processor 300.

Figure 3:
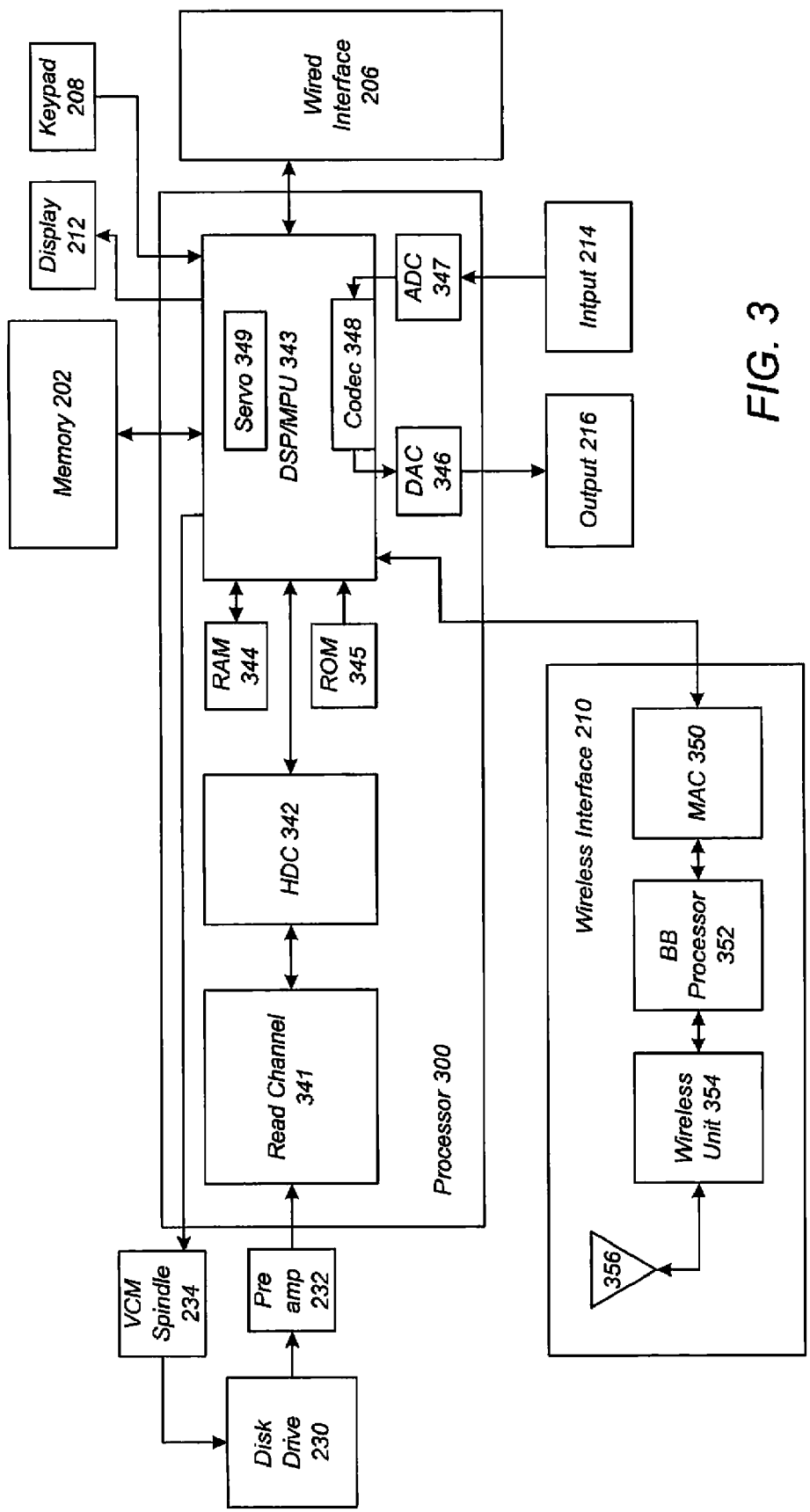
FIG. 3 is a more detailed block diagram of a first embodiment of the media player/recorder of FIG. 2.

FIG. 3 is a detailed block diagram of processor 300. Processor 300 is preferably implemented as a single integrated circuit. A media playback/recorder apparatus having a processor implemented as a single integrated circuit can be fabricated at lower cost and have lower energy consumption. Alternatively, processor 300 may be implemented by discrete components. Processor 300 comprises a read channel 341, storage controller or hard disk controller 342, digital signal processor/microprocessor unit (DSP/MPU) 343, random access memory (RAM) 344, a non volatile memory such as read only memory (ROM) 345, digital to analog converter (DAC) 346 and analog to digital converter (ADC) 347. DSP/MPU 343 comprises servo controller 349 and Codec 348. In a preferred embodiment, DSP/MPU 343 is implemented as a single integrated circuit. In another embodiment, MPU may be implemented as one integrated circuit and the DSP may be implemented as another integrated circuit.

It is noted that DSP/MPU 343 may comprise a microprocessor unit, a digital signal processor, or any combination thereof. ROM 345 stores programmed instructions for processor 300 and DSP/MPU 343 to control the operation of both the disk drive 230 (and associated circuitry) and the signal processing of the media data. RAM 345 is provided as a working memory for DSP/MPU 343. For each of the various compression formats discussed above, the decompression and compression algorithms for Codec 348 are stored on disk drive 230. Storing the decompression and compression algorithms on disk drive 230 minimizes the size of ROM 345 and its energy consumption. Additionally, this feature allows future compression and decompressions formats to be easily implemented for the media player/recorder.

In the implementation of FIG. 3, wireless interface 210 is implemented separately from processor 300, and includes an antenna 356, a wireless unit 354, a baseband processor 352, and a media access controller (MAC) 350. Antenna 356 is a conventional antenna for receiving and transmitting wireless signals. Wireless unit 354 converts wireless signals received by antenna 356 to analog baseband signals, and converts analog baseband signals received from baseband processor 352 to wireless signals for transmission by antenna 356. Baseband processor 352 converts analog baseband signals received from wireless unit 354 to a digital bitstream, and converts a digital bitstream received from MAC 350 to analog baseband signals, both according to well-known methods. MAC 350 frames the digital bitstream produced by baseband processor 352, and filters the frames to select the frames addressed to processor 300, both according to well-known methods. MAC 350 also converts frames received from processor 300 to a digital bitstream for baseband processor 352, also according to well-known methods. In some implementations, MAC 350 includes an embedded microprocessor.

Figure 6:
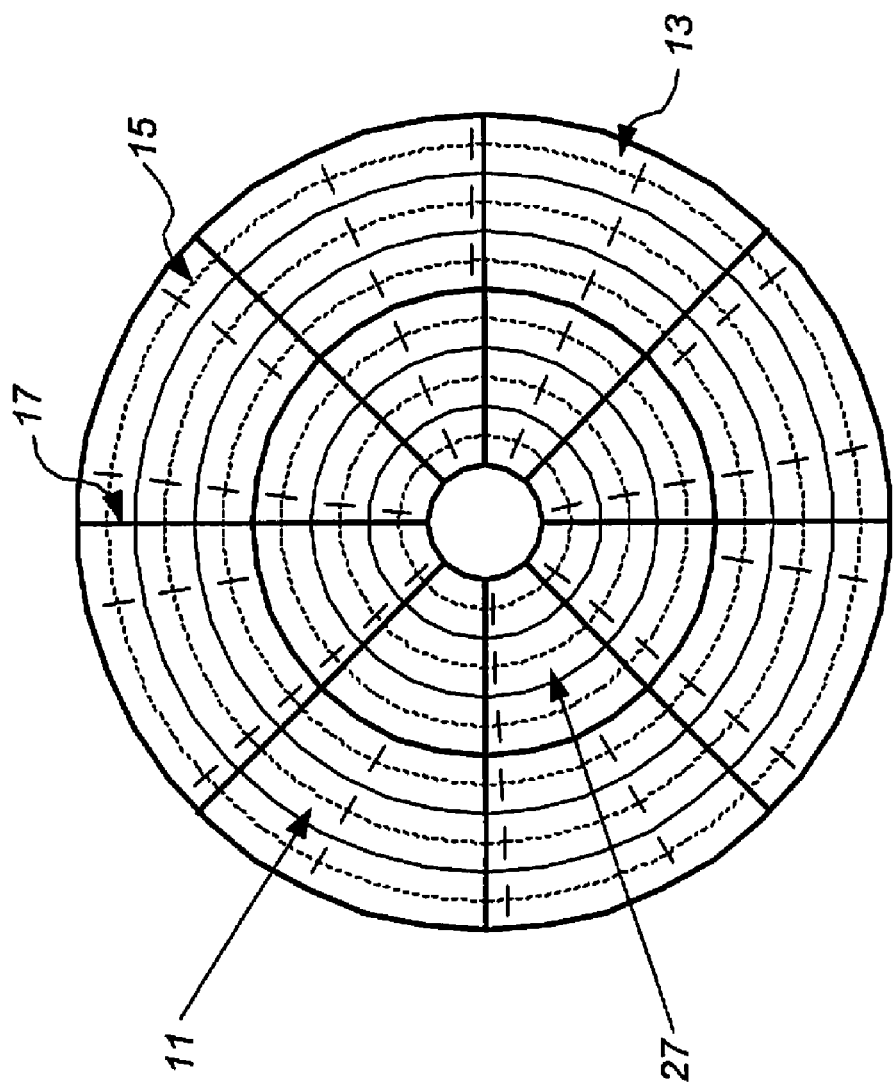
FIG. 6 shows an exemplary data format of a magnetic disk having a plurality of concentric tracks comprised of a plurality of user data sectors and embedded servo data sectors.

Prior to discussing the operation of processor 300, reference is made to FIG. 6. FIG. 6 shows an exemplary data format of a magnetic media used in disk drive 230, comprising a series of concentric data tracks 13 wherein each data track 13 comprises a plurality of sectors 15 with embedded servo wedges 17. Servo controller 349 processes the servo data in servo wedges 17 and, in response thereto, positions the read/write head over a desired track. Additionally, servo controller 349 processes servo bursts within servo wedges 17 to keep a disk head of disk drive 230 aligned over a centerline of the desired track while writing and reading data. Servo wedges 17 may be detected by the discrete time sequence detector implemented in DSP/MPU 343. It is important to note that DSP/MPU 343 is utilized only during the time period for detecting servo wedges 17; during other periods DSP/MPU 343 is available to perform other functions as described below, such as signal processing for media data playback and recording. By using only one DSP rather than two, the cost of fabrication and the amount of energy consumption can be reduced.

As described above, the powering up of the device is done in a sequential manner so as to minimize energy consumption of the device. More specifically, the mechanical or motor portions of the storage device are energized first. After the motor reaches operating speed, VCM 234 is energized, followed by the energization of read channel 341 and HDC 342.

The operation of processor 300 is as follows. DSP/MPU 343 controls the entire operation of the media player/recorder. DSP/MPU 343 is coupled to hard disk controller 342. When writing data to disk drive 230, hard disk controller 342 receives a write instruction and write data from DSP/MPU

343. The write data is temporarily stored in a cache memory (not shown) which is used as a buffer memory. Based on a clock from a clock generator (not shown), DSP/MPU 343 controls voice coil motor (VCM) and spindle motor 234 via servo unit 349. As a result, the magnetic head is moved to a desired track position on the magnetic disk by the head arm, and the magnetic disk is rotated at a rated rotational speed by the spindle, which is driven by spindle motor 234. The data is read from the cache memory and supplied to read channel 341 via hard disk controller 342. Read channel 341 encodes the write data under the control of DSP/MPU 343, and supplies the encoded write data to preamplifier 232. The magnetic head writes the encoded write data on the magnetic disk in accordance with a signal from preamplifier 232.

When reading data from the magnetic disk, hard disk controller 342 receives a read instruction from DSP/MPU 343. Based on a clock signal, DSP/MPU 343 controls voice coil motor and spindle motor 234 via servo unit 349. Hence, the magnetic head is moved to a desired track position on the magnetic disk by the head arm, and the magnetic disk is rotated by spindle motor 234.

The data read from the magnetic disk by the magnetic head is supplied to read channel 341 via preamplifier 232. Read channel 341 decodes the read data under the control of DSP/MPU 343, and generates read data. The read data are supplied from read channel 341 to hard disk controller 342 under the control of DSP/MPU 343, and are temporarily stored in the cache memory. The read data read from the cache memory are supplied to DSP/MPU 343 from hard disk controller 342.

As noted above, operation of the media player/recorder is controlled by the user through keypad 208, which is in communication with DSP/MPU 343. Status of the media player/recorder is provided to the user by display 212 in accordance with DSP/MPU 343. When either uploading or downloading data, the media player/recorder is in communication with personal computer, network appliance, local area network, Internet 50. Otherwise the media player/recorder can be operated independently. The user selects the file to be downloaded from personal computer, network appliance, local area network, Internet 50 by way of keypad 208. Alternatively the user can select the file to be downloaded from the personal computer. DSP/MPU 343 controls the flow of data through interfaces 206 and/or 210 and stores the data onto hard disk 230 in accordance with the method described above. When uploading data to personal computer, network appliance, local area network, Internet 50 the process is reversed.

To record data directly input into media player/recorder from an external analog source, the external device is placed in communication with input 214. Input 214 takes the input signal from the external device and sets the analog signal to an appropriate level. The analog signal is then converted to a digital signal by ADC 347 of processor 300. Codec 348 of DSP/MPU 343 compresses the digitized data using a default compression format or one selected by the user by way of keypad 208. The default or selected compression program is transferred from hard disk 230 to RAM 344 and provided to Codec 348 for encoding. The compressed digital data is similarly stored on disk drive 230 under the control of DSP/MPU 343.

When the user chooses a selection of media data to be played back with keypad 208, DSP/MPU 343 powers up disk drive 230 and retrieves the selected data as described above. The retrieved data is then written to memory 202. After the selected data is stored in memory 202, disk drive 230 is then powered down by DSP/MPU 343. In this manner, during playback disk drive 230 is powered up only during the transfer of the selected media data from disk drive 230 to memory 202, which results in lower energy consumption. A single song stored in MP3 format may take approximately one second to retrieve from disk drive 230. The media data is retrieved from memory 202 by DSP/MPU 343 and the compression format is then determined.

If the decompression program has already been transferred to RAM 344, the program is provided to Codec 348. Otherwise the decompression algorithm is retrieved from hard disk 230 and transferred to RAM 344. The data is then decompressed by Codec 348 and converted to an analog signal by DAC 346. The analog signal is set to an appropriate level by output circuit 216. If the analog signal contains audio data, output circuit 216 is connected to a speaker, headphone and the like for playback, and if the analog signal contains video data, output circuit 216 is connected to a display device for playback.

It is noted that the capacity of disk drive 230 is selected to hold a desired amount of media data, and the amount of solid state memory 202 is selected to minimize energy consumption. A disk drive having a capacity of 1 Gbyte can store approximately 30 hours of MP3 compressed music.

This section will described the power management control of the device by CPU/MPU 343.

Figure 7:
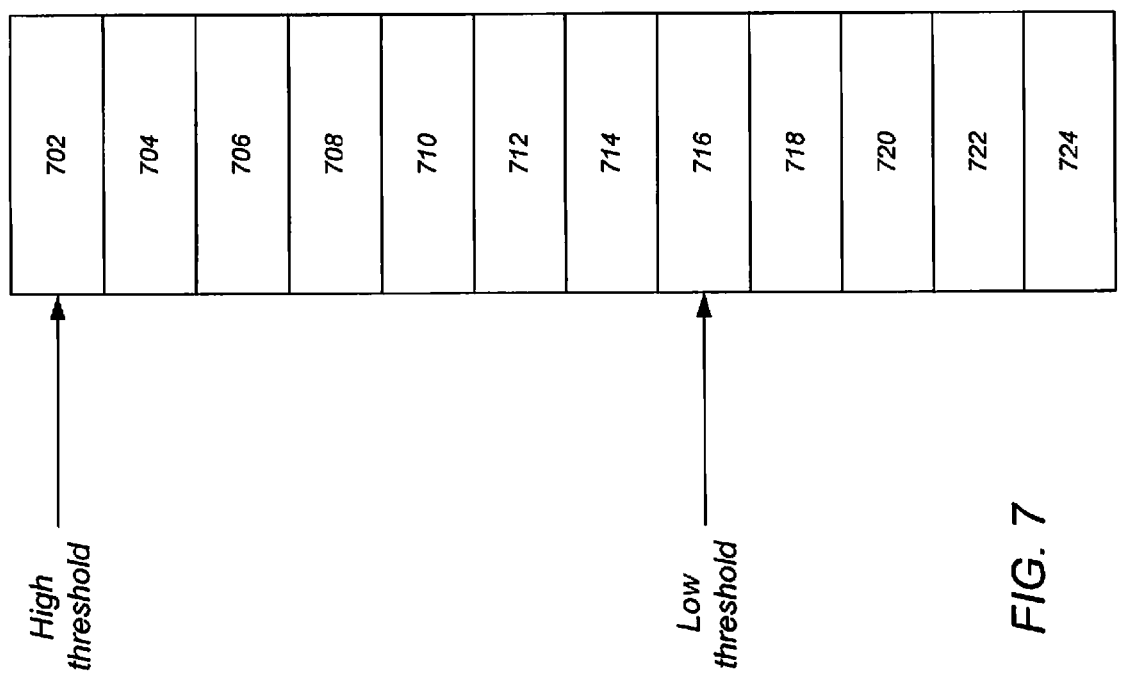
FIG. 7 is a schematic representation of memory 202.
Figure 9:
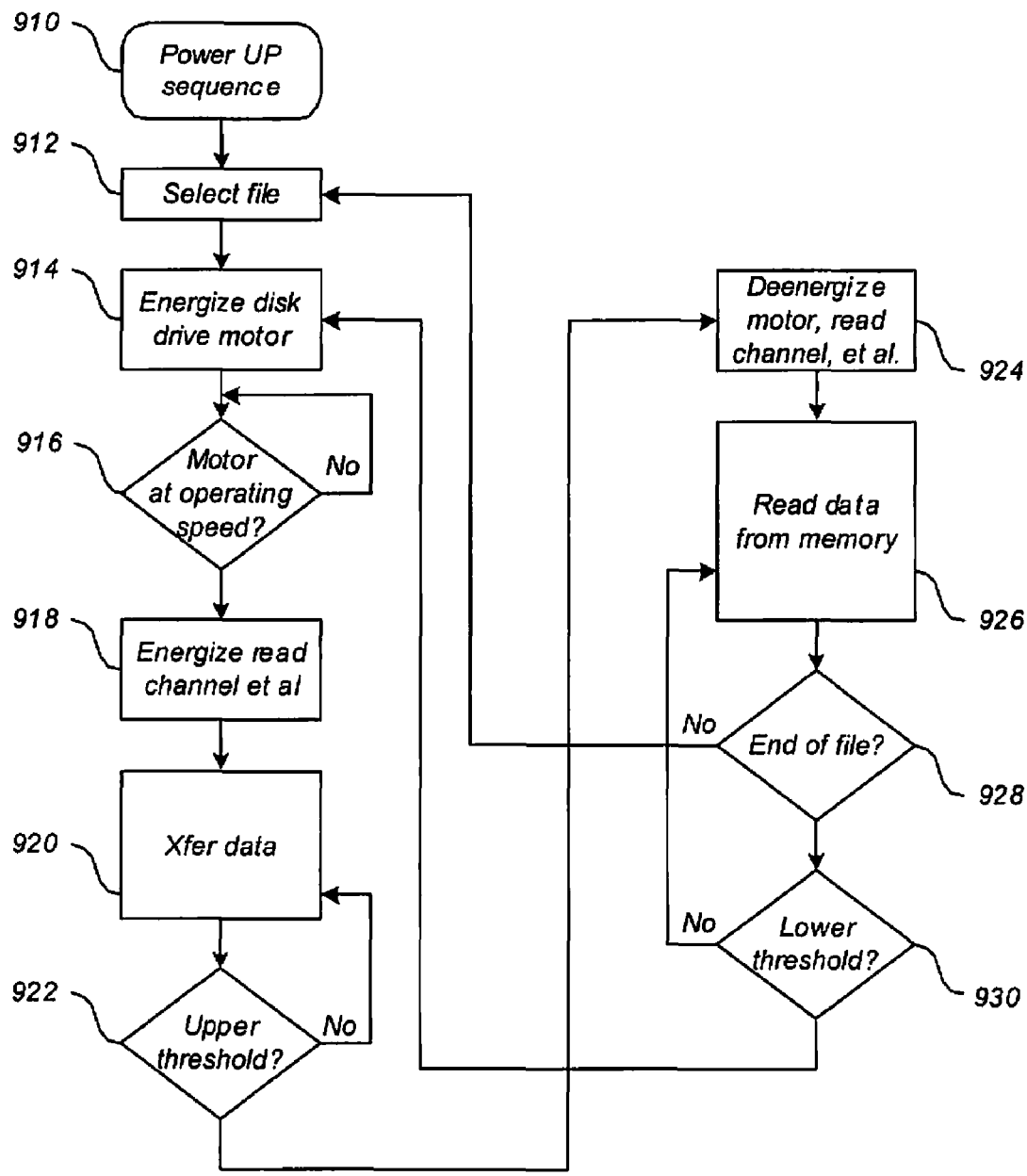
FIG. 9 is flow chart of an energization/deenergization procedure according to a first embodiment of the present invention.

Referring now to FIGS. 3, 7 and 9, when the user turns on the media player and selects a file to be played (step 912), the various components of media player are powered up in a sequential manner so as to minimize energy consumption of the device. More specifically, the mechanical or motor portions of the storage device or disk drive 230 are energized first (step 914). After the motor reaches its operating speed (step 916), VCM 234, preamp 232, read channel 341 and HDC 342 are energized, since these components are only functional after disk drive 230 becomes operational. Energy would be unnecessarily expended if preamp 232, read channel 341 and HDC 342 were energized before disk drive 230 becomes operational. Therefore, VCM 234, preamp 232, read channel 341 and HDC 342 are energized only after disk drive 230 becomes operational (step 918). Preamp 232, read channel 341 and HDC 342 can be referred to as a storage circuit and include circuits to transform data stored on a storage device to a digital signal.

FIG. 7 is a schematic representation of memory 202. User data is first stored from location 724 to location 702 in a sequential manner in memory 202. In one embodiment, DSP/MPU 343 uses a pointer system in connection with memory 202 to determine when the amount of data stored the amount data stored reaches an upper threshold value (step 922). When the amount of data stored in memory 202 reaches the upper threshold value, HDC 342, read channel 341, preamp 232, disk drive 230 and VCM 234 are powered down or deenergized (step 924). Of course, as will be appreciated by one of ordinary skill in the art, while data is being to memory 202, data may also be read contemporaneously therefrom by DSP/MPU 343 for decompression and playback. Data is then read out from memory 202 starting at location 702 towards location 724 by DSP/MPU 343 (step 926). When the data file has been completely read from memory (step 928), the user can select another file. The data is continually read from memory 202, until the amount of data remaining is below a low threshold value (step 930). When the data remaining in memory 202 is below the threshold value, disk drive 230, VCM 234, preamp 232, read channel 341 and HDC 342 are sequentially energized as noted above, and data is transferred from the storage device to memory 202.

Figure 10:
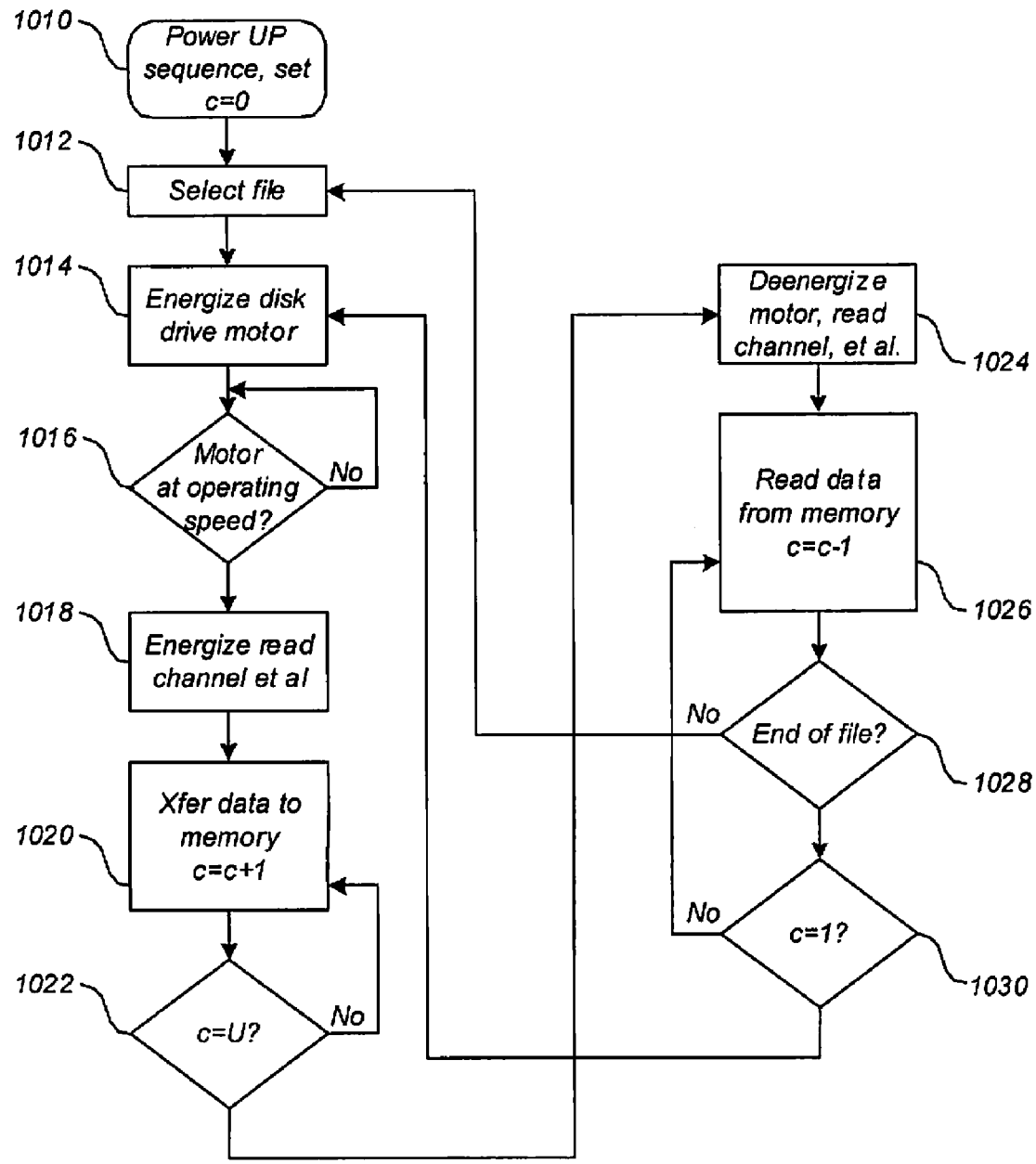
FIG. 10 is flow chart of an energization/deenergization procedure according to a second embodiment of the present invention.

FIG. 10 is an alternate embodiment to FIG. 9. Instead of utilizing a pointer system, the amount of data transferred to memory 202 is counted (step 1020) by a counter incorporated in DSP/MPU 343. The sequential energization of the disk drive 230, VCM 234, preamp 232, read channel 341 and HDC 342 is similar to that of the embodiment of FIG. 9 (steps 1012, 1014, 1016 and 1018). When amount of data transfer to memory 202 is greater than or equal to an upper limit U (step 1022), HDC 342, read channel 341, preamp 232, disk drive 230 and VCM 234 are powered down or deenergized (step 1024). As data is read from memory, the counter decrements the count, and when the count is less than or equal to a lower limit 1 (step 1030), disk drive 230, VCM 234, preamp 232, read channel 341 and HDC 342 are sequentially energized as noted above, and data is transferred from the storage device to memory 202.

Figure 11:
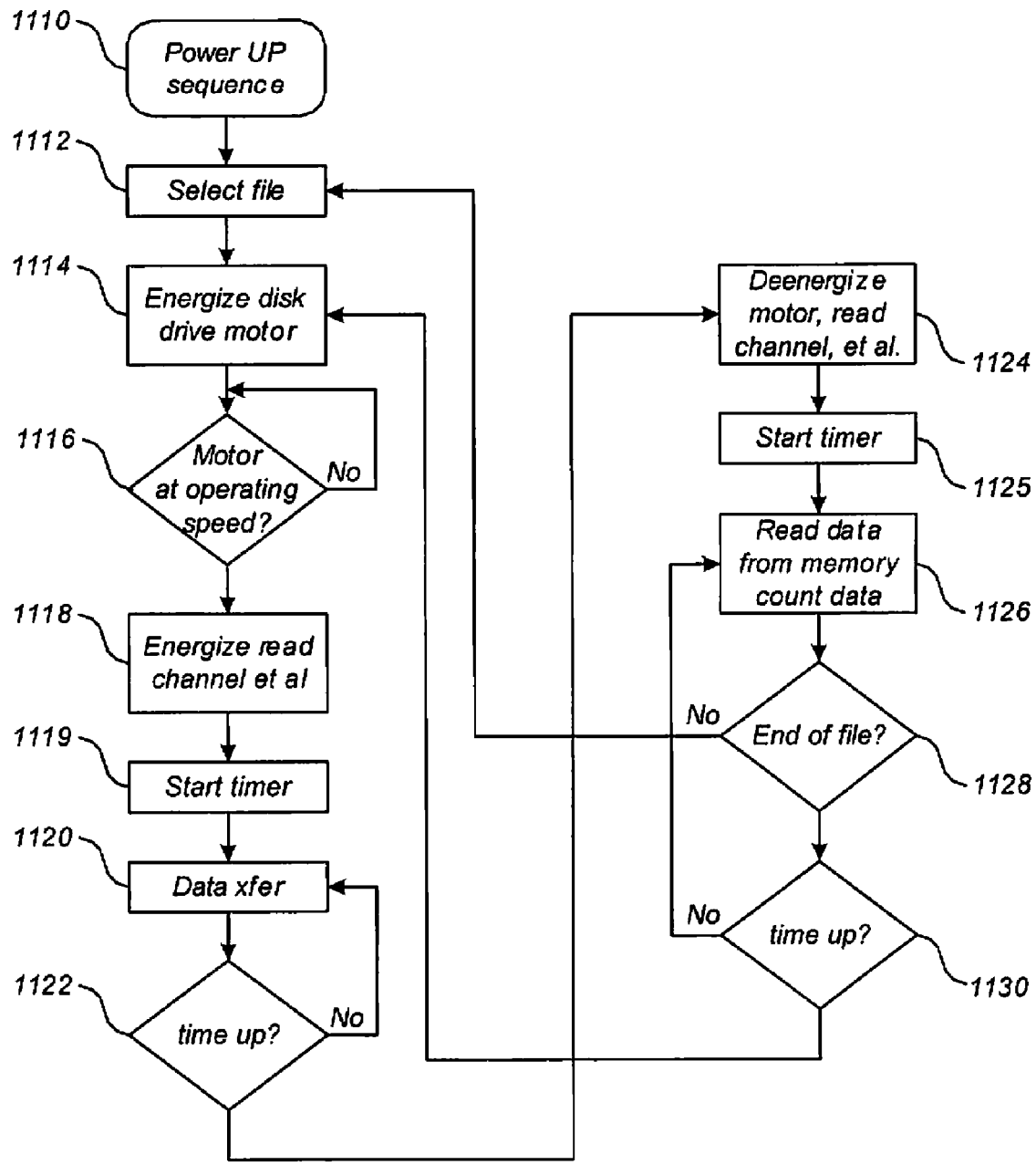
FIG. 11 is flow chart of an energization/deenergization procedure according to a third embodiment of the present invention.

FIG. 11 is another alternate embodiment to FIG. 9. The embodiment in FIG. 9 utilizes a timer incorporated in DSP/MPU 343 to approximate the amount of data transferred to memory 202 in accordance with the data transfer rate of disk drive 230. The sequential energization of disk drive 230, VCM 234, preamp 232, read channel 341 and HDC 342 is similar to that of the embodiment of FIG. 9 (steps 1112, 1114, 1116 and 1118). The timer is started (step 1119) as data is transferred form disk drive 230 to memory 202. When the timer times out, HDC 342, read channel 341, preamp 232, disk drive 230 and VCM 234 are powered down or deenergized (step 1124). As data is read from memory, the timer is started (1125), and when the timer times out (step 1130), disk drive 230, VCM 234, preamp 232, read channel 341 and HDC 342 are sequentially energized as noted above, and data is transferred from the storage device to memory 202.

Figure 8:
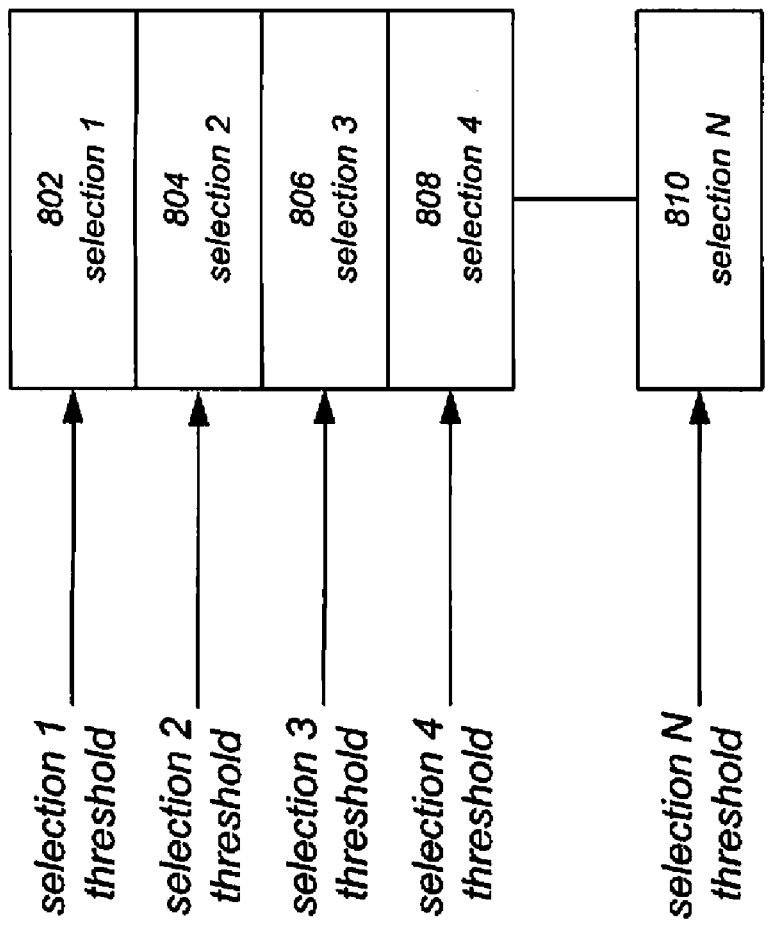
FIG. 8 is a memory map of memory 202.
Figure 12:
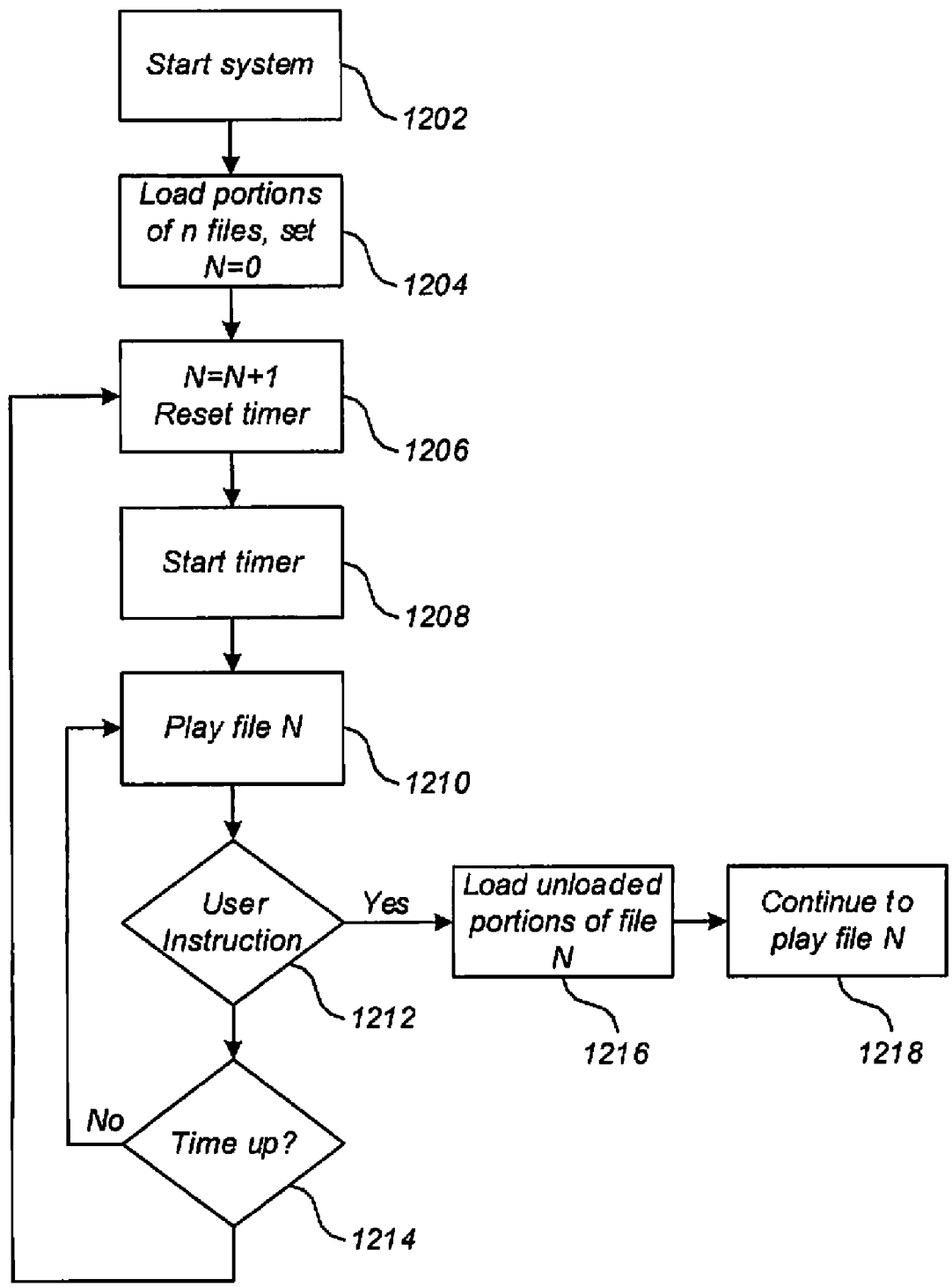
FIG. 12 is flow chart of an operating procedure according to the present invention.

In the simplest implementation, media data representing one selection (such as a single song) is transferred from disk drive 230 to memory 202 for playback. FIG. 8 is a schematic representation of memory 202, and FIG. 12 is a flow chart illustrating an alternate implementation. As shown therein, instead of retrieving just one selection, first portions of multiple selections are transferred from disk drive 230 to memory 202. These multiple selections may include the user's favorite selections, random selections from an external source, or the like (step 1204). When the user starts playing back the selection, a timer is started (step 1208) and the first selection is played back (step 1210). If a user instruction is received (step 1212) to continue playing that selection is received within a predetermined time (step 1214), the remaining portion of the selection is transferred from disk drive 230 to memory 202 (step 1216) for continued play back (step 1218). If the timer times out (step 1214), the first portion of the next selection (step 1206) is played back and the process is repeated for each remaining first portion. Alternatively, instead of using a timer, a memory threshold, as shown in FIG. 8, may be utilized permit playback of the entire current selection if the user instruction is received before the memory being read out goes below the current selection threshold. Otherwise the first portion of the next selection is played back. Of course, the play back of portions of selections 1 through N may be in any order, such as sequential, random and predetermined. If the play back is in sequential order new selections may be transferred from disk drive 230 to memory 202 to replace previously played back selections.

Figure 4:
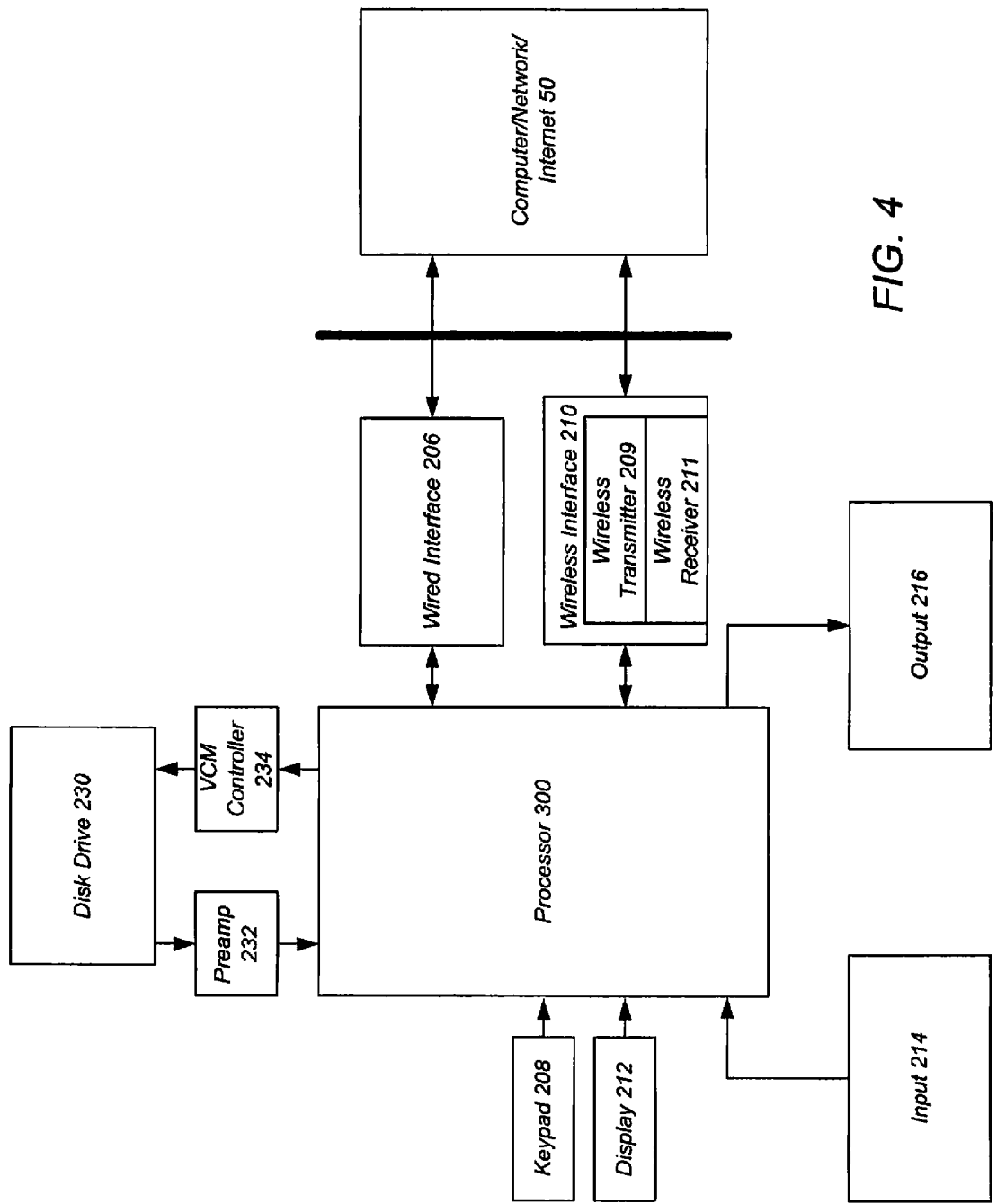
FIG. 4 is a block diagram of a second embodiment of a media player/recorder in accordance with the present invention.
Figure 5:
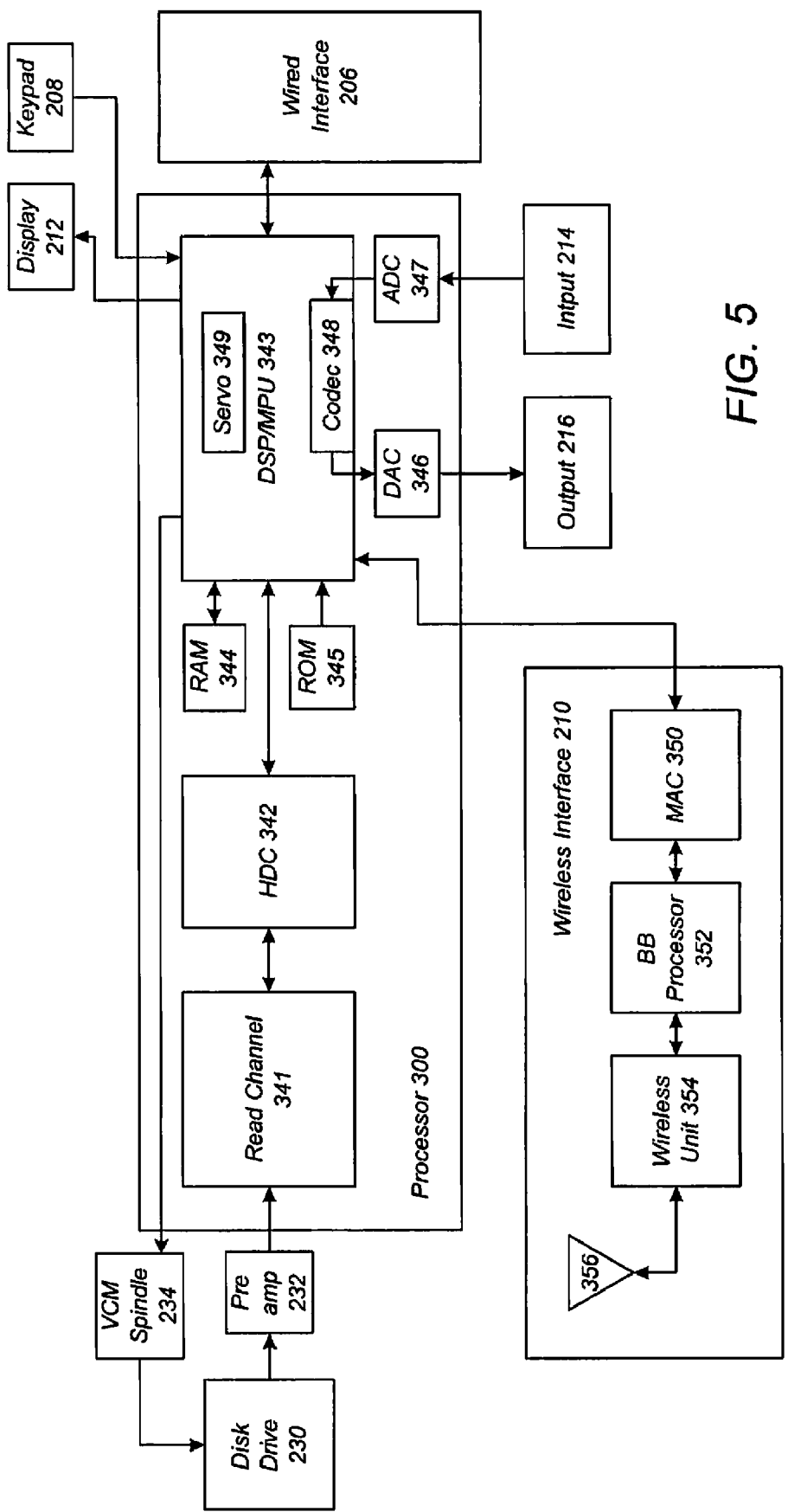
FIG. 5 is a more detailed block diagram of the media player/recorder of FIG. 4.

FIGS. 4 and 5 show a second embodiment of the present invention. The second embodiment is similar to the first embodiment except the second embodiment does not include memory 202. In this embodiment media data is recorded in a similar manner as the first embodiment and no further discussion is provided herein. For playback operation, the media data is retrieved directly from disk drive 230 for playback through output 216. The other portions of the playback operation are similar to the first embodiment. In the second embodiment disk drive 230 will be powered on any time media data is recorded or played back. As such this embodiment is particularly applicable when the power supply is external. For example the media player/recorder of the second embodiment may be a portable device used in an automobile supply by energy therefrom. In some implementations, MAC 350 includes an embedded microprocessor.

Figure 13:
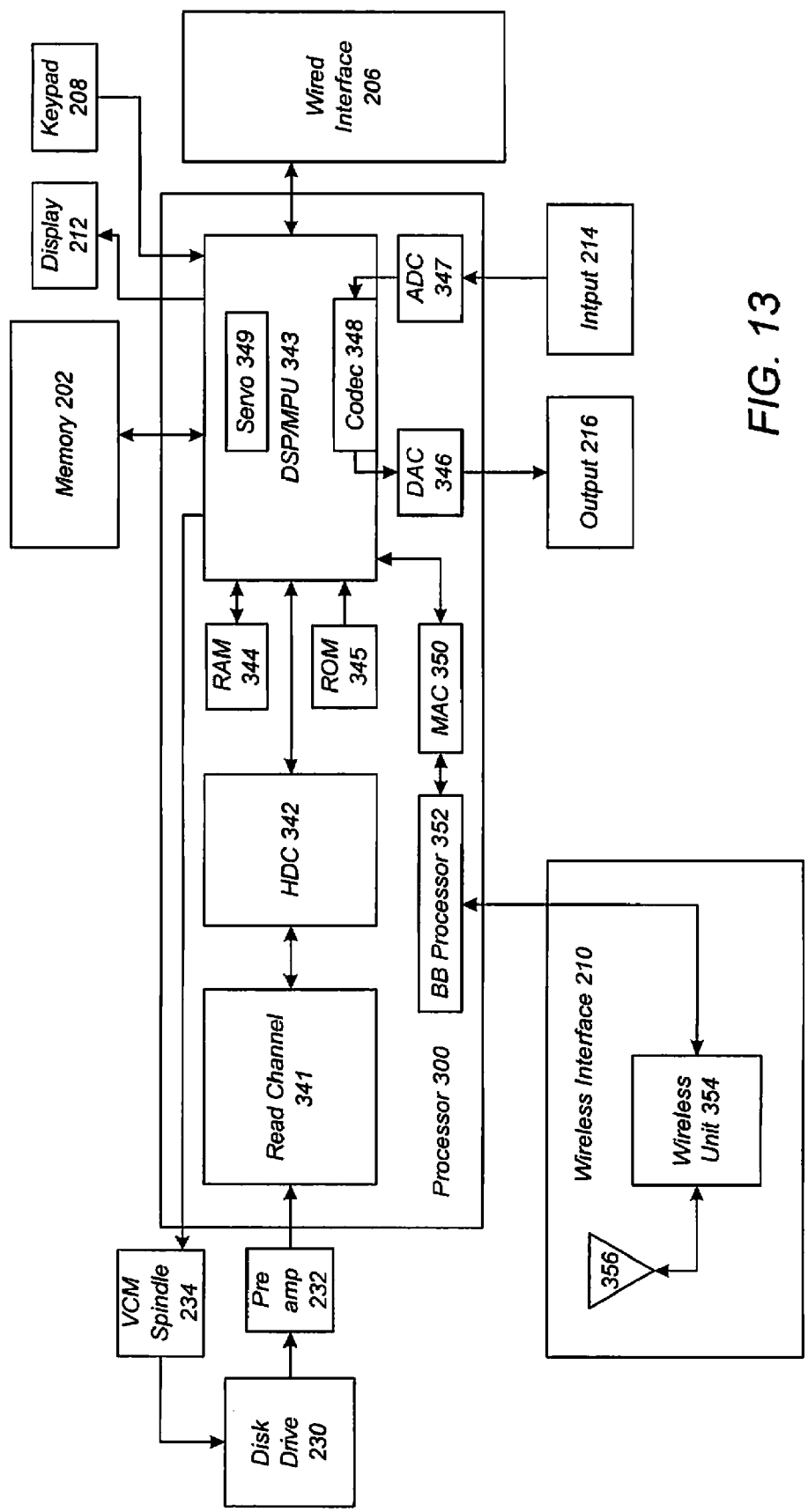
FIG. 13 shows a variation of the first embodiment of the media player/recorder of FIG. 2.

FIG. 13 shows a variation of the first embodiment. According to this variation, baseband processor 352 and MAC 350 are implemented within processor 300, preferably as a single integrated circuit. Wireless interface 210 includes antenna 356 and wireless unit 354. This variation operates as described for the first embodiment. In some implementations, MAC 350 includes an embedded microprocessor.

Figure 14:
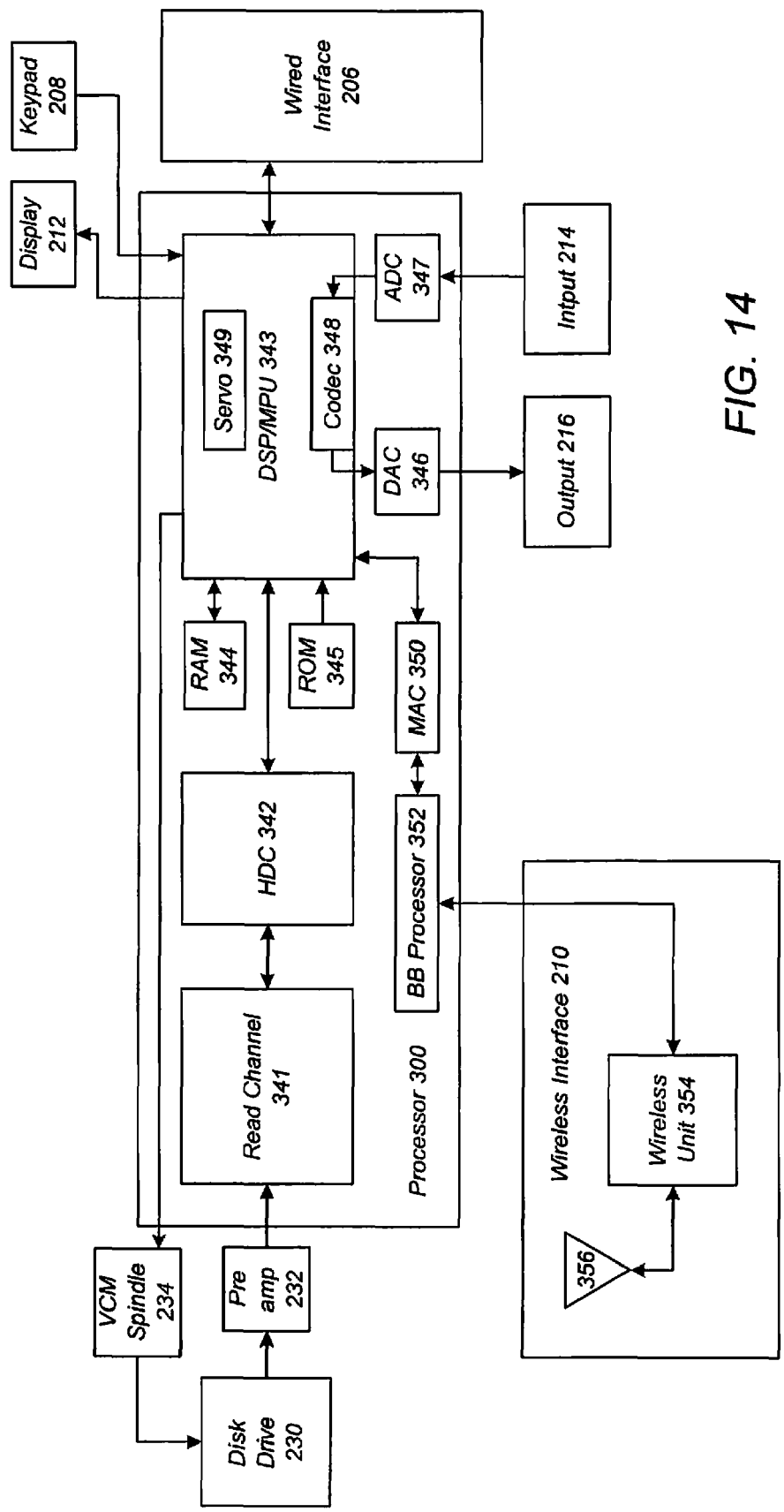
FIG. 14 shows a variation of the second embodiment of the media player/recorder of FIG. 2.

FIG. 14 shows a variation of the second embodiment. According to this variation, baseband processor 352 and MAC 350 are implemented within processor 300, preferably as a single integrated circuit. Wireless interface 210 includes antenna 356 and wireless unit 354. This variation operates as described for the first embodiment. In some implementations, MAC 350 includes an embedded microprocessor.

Figure 15:
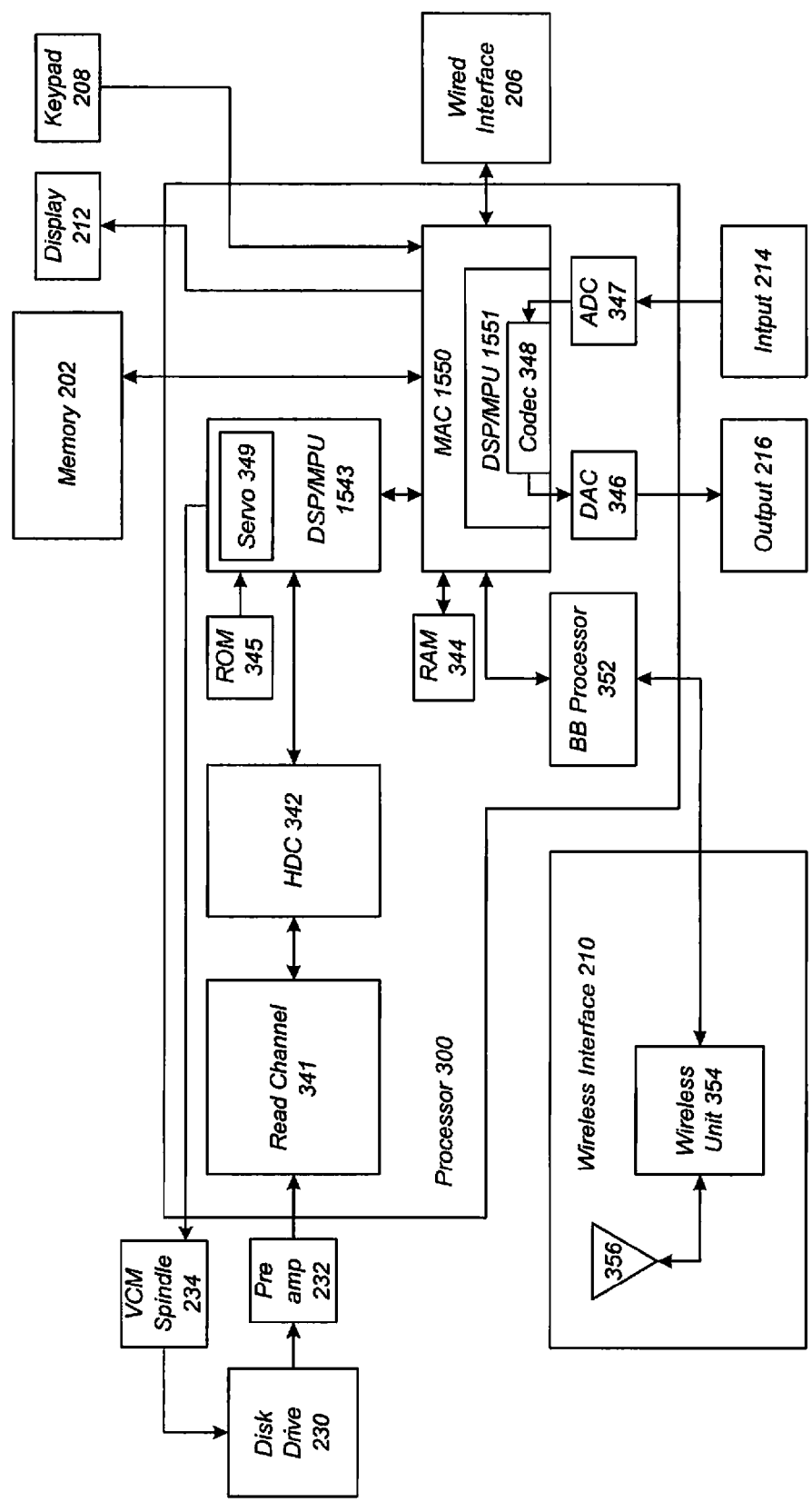
FIG. 15 is a block diagram of a third embodiment of a media player/recorder in accordance with the present invention.

FIG. 15 is a block diagram of a third embodiment of a media player/recorder in accordance with the present invention. According to this embodiment, a MAC 1550 is implemented within processor 300, which is preferably implemented as a single integrated circuit, and includes an embedded digital signal processor and microprocessor unit (DSP/MPU) 1551. DSP/MPU 1551 includes codec 348, and communicates with memory 202, display 212, keypad 208, wired interface 206, RAM 344, DAC 346, and ADC 347, which function as described above with reference to FIG. 3. DSP/MPU 343 has been replaces with DSP/MPU 1543, which controls disk drive 230, read channel 341, and HDC 342 as described above.

Figure 16:
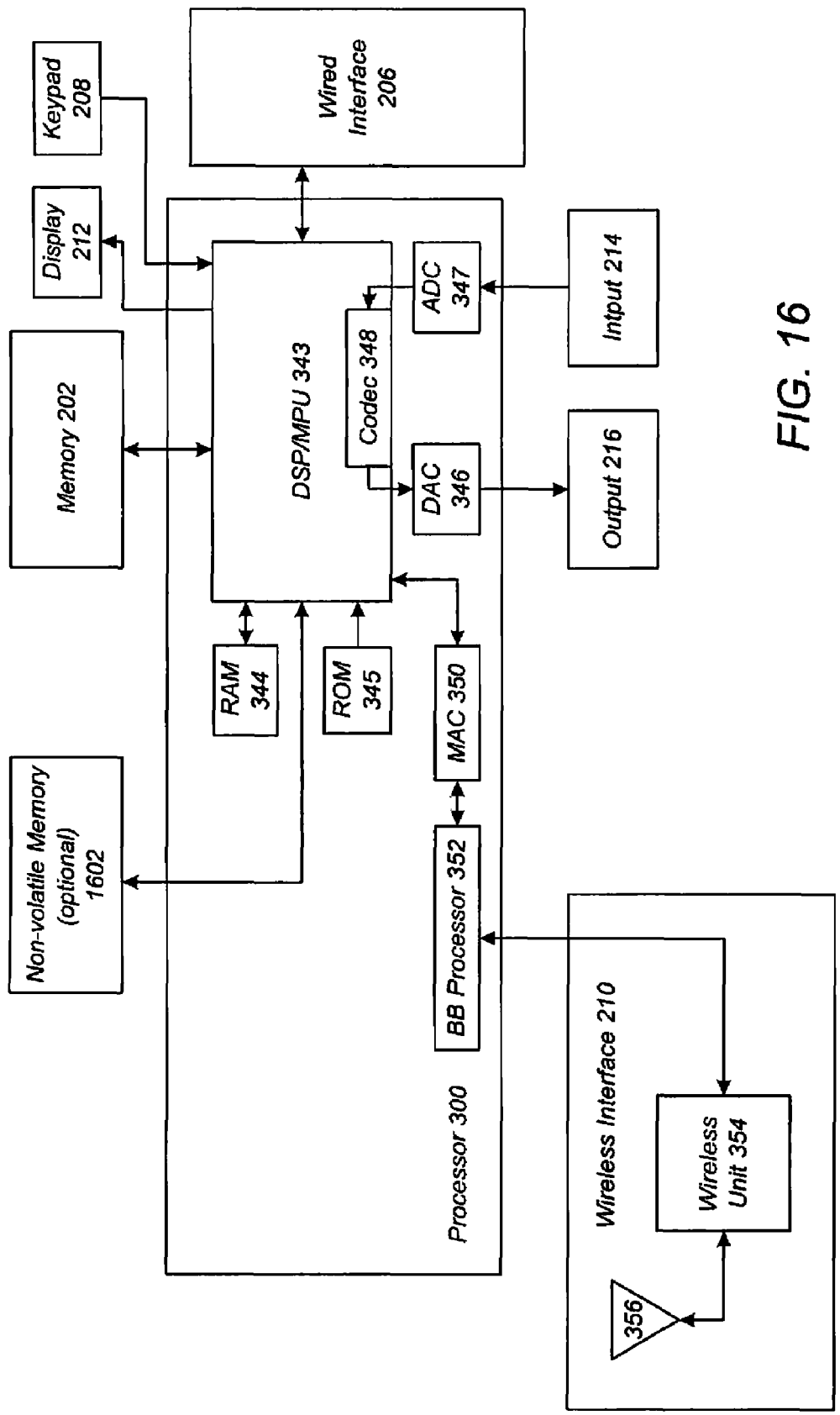
FIG. 16 is a block diagram of a fourth embodiment of a media player/recorder in accordance with the present invention.

FIG. 16 is a block diagram of a fourth embodiment of a media player/recorder in accordance with the present invention. This embodiment is similar to the above embodiments, but has no hard drive. Some implementations of this embodiment optionally include a non-volatile memory 1602 such as a flash memory instead of a hard drive. Consequently the circuits associated with the hard drive are also eliminated, resulting in a less-expensive media player/recorder. In the depicted implementation, baseband processor 352 and MAC 350 are implemented within processor 300, which is preferably implemented as a single integrated circuit. In other implementations, baseband processor 352 and MAC 350 are implemented separately from processor 300, for example, within wireless interface 210. In some implementations, MAC 350 includes an embedded DSP/MPU. These implementations operate in a manner similar to that described for the implementations of FIG. 15.

The implementations using non-volatile memory instead of a hard drive are especially useful for receiving streaming media from broadcasts such as internet radio stations and other media player recorders. Some implementations feature a "broadcast" mode where the media player/recorder plays a media selection and wirelessly transmits the media selection, either compressed or uncompressed, or in analog form, such that other media player/recorders can receive the broadcast media and play it at the same time as the broadcasting player/recorder.

Figure 17:
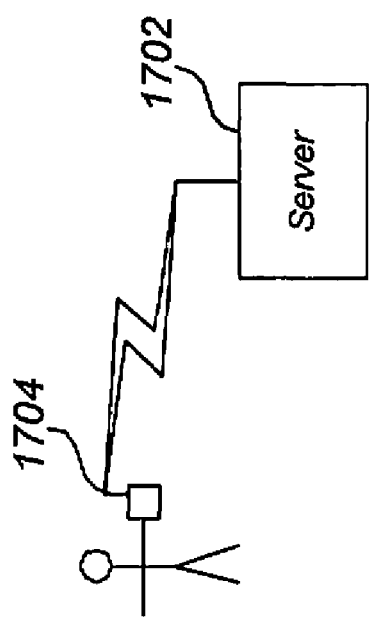
FIG. 17 illustrates a mode of some implementations referred to as "local radio mode."

The implementations with no hard drive or non-volatile memory are especially useful in a "local radio" mode where the media to be played is stored on a personal computer, server, or the like that is separate from the media player/recorder. FIG. 17 illustrates the local radio mode. In this mode, the media is wirelessly streamed to the media player/ recorder 1704, which decompresses and plays the media without storing the media. Because the media player/recorder never stores a copy of the media, it is ideal for playing media for which only a single copy is licensed. The single copy is stored on a personal computer (PC) 1702, and is streamed to media player/recorder 1704 for playback. Because only a single copy of the media is stored, the single-copy license is satisfied.

Figure 20:
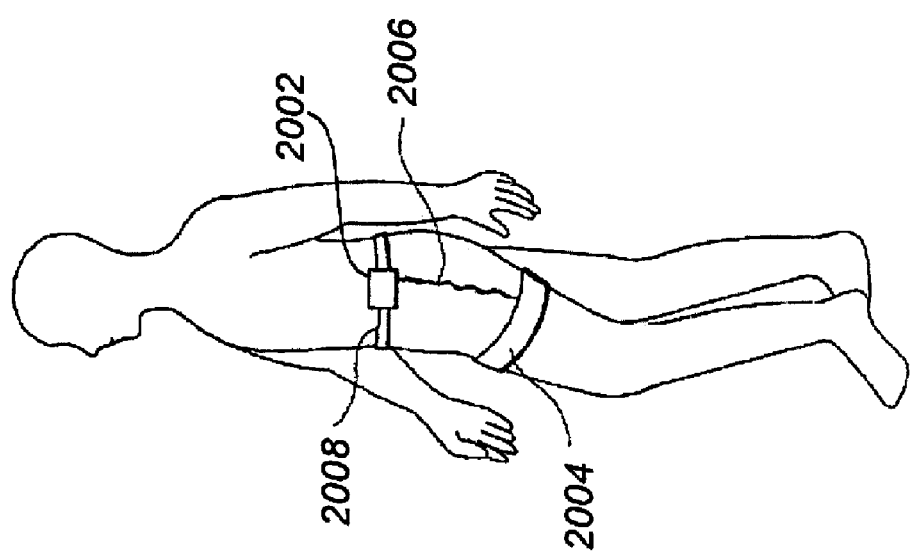
FIG. 20 shows an implementation where a media player/recorder communicates with a biometric sensor over a cable.

FIG. 20 shows an implementation where a media player/recorder 2004 is implemented within a digital camera 2002. In recording mode, an image sensor 2006 within camera 2002 captures one or more images, and passes a signal representing the image to media player/recorder 2004. If the signal is analog, a analog-to-digital converter within media player/recorder 2004 converts the analog signal to a digital signal. A digital signal processor within media player/recorder 2004 then encodes the digital signal. The encoding can include image compression, image manipulation, and the like. A storage controller within media player/recorder 2004 stores the encoded image data on a storage device. In some implementations, digital camera 2002 is a digital motion picture camera and the encoded image data represents a motion picture.

Figure 19:
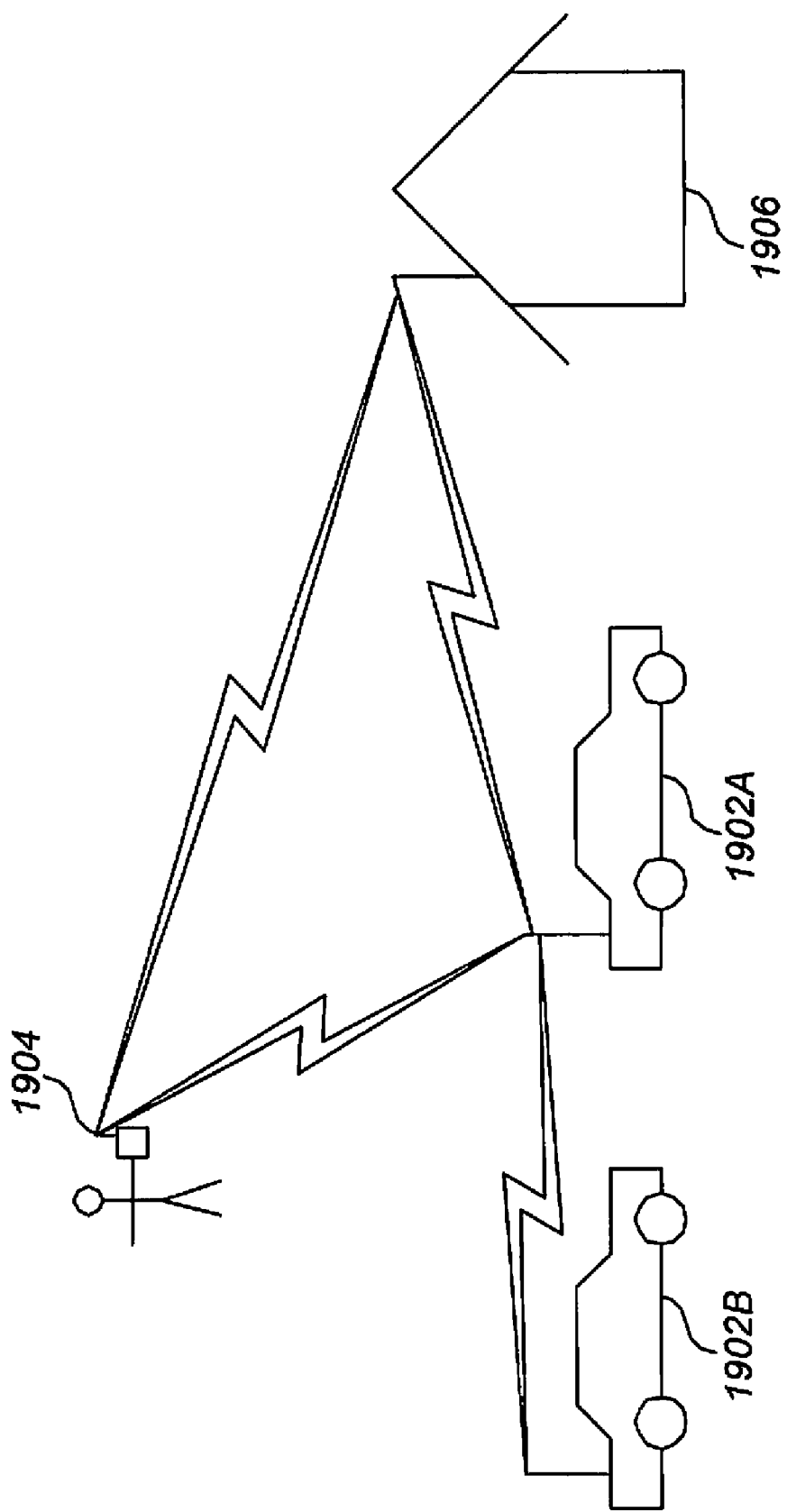
FIG. 19 shows automobiles equipped with a media player/recorder in accordance with the present invention.

In playback mode, the storage controller retrieves the encoded image data from the storage device. The digital signal processor decodes the retrieved encoded image data. Media player/recorder 1804 sends a signal representing the decoded image data to a display 1808, which displays the image(s) captured by image sensor 1806. A The media player/recorder described herein can be implemented as a portable unit, as a permanently mounted unit within a vehicle such as an automobile, and the like. FIG. 19 shows automobiles 1902A and 1902B equipped with such a media player/recorder. In this implementation, the antenna of the automobile can serve as the antenna of the media player/recorder. The media player/recorders in the automobiles 1902 can communicate with each other, without user intervention, while traveling near each other, while stopped at intersections, and in other similar scenarios, to share media data, items of interest, and the like. The media player/recorders in the automobiles 1902 can also communicate with portable media player/recorders 1904 in a similar fashion. The vehicular and portable media player/recorders can communicate with a stationary base station 1906 to share media over a network such as the Internet. For example, a homeowner can equip his garage with such a base station 1906 so the media player/recorder in his automobile can share media and items of interest while parked in the garage during the night. Similarly, a user of a portable player/recorder 1904 can equip his home with a base station 1906 so the media player/recorder 1904 can share media and items of interest while not otherwise in use, for example while the user sleeps.

Some implementations receive and store data other than media data. In some implementations the media player/recorder records biometric data collected by a biometric sensor disposed near, upon, or within a human body or other organism. The biometric data can represent biological functions such as breathing, heart function, body temperature, blood pressure, and the like. Such devices and methods are well-know in the relevant arts, and are described in U.S. Pat. No. 6,023,662 entitled "Measurement Device, Portable Electronic Instrument, And Measurement Method," issued Feb. 8, 2000; U.S. Pat. No. 6,030,342 entitled "Device For Measuring Calorie Expenditure And Device For Measuring Body Temperature," issued Feb. 29, 2000; U.S. Pat. No. 6,036,653 entitled "Pulsimeter," issued Mar. 14, 2000; and U.S. Pat. No. 6,081,742 entitled "Organism State Measuring Device and Relaxation Instructing Device," issued Jun. 27, 2000, the disclosures thereof incorporated by reference herein in their entirety.

Figure 18:
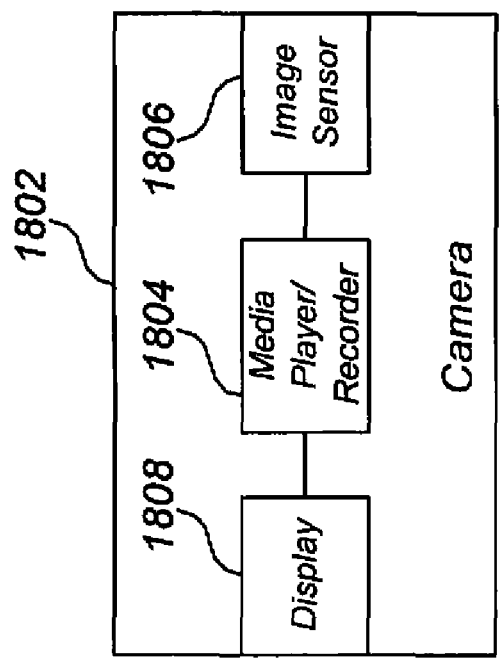
FIG. 18 shows an implementation where a media player/recorder is implemented within a digital camera.
Figure 21:
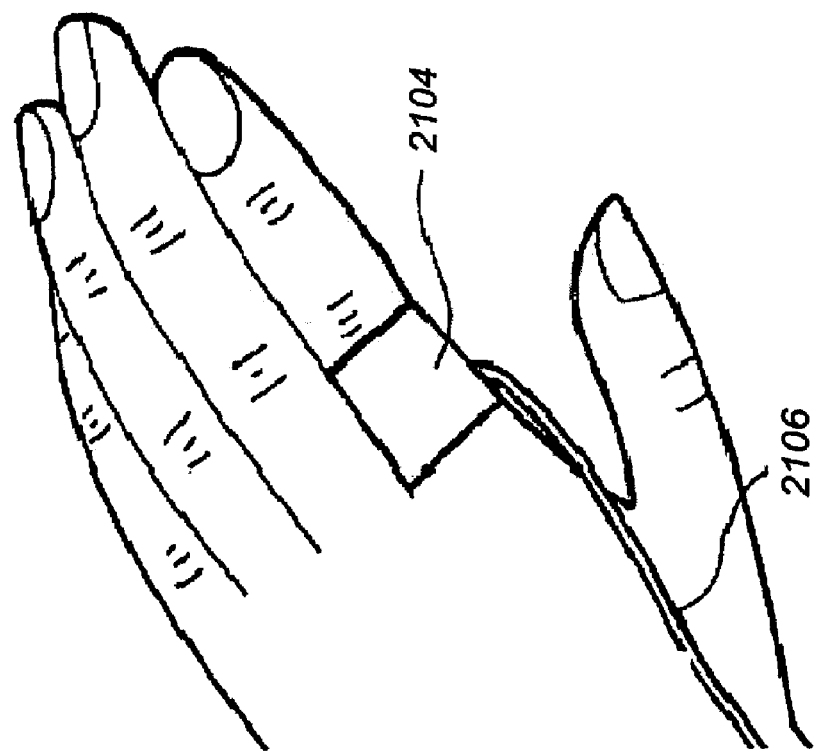
FIG. 21 show a biometric sensor worn on a finger and transmitting biometric data over a cable.

FIG. 18 shows an implementation where a media player/recorder 1802 communicates with a biometric sensor 1804 over a cable 1806. The biometric data collected by biometric sensor 1804 is passed to media player/recorder 1802 over cable 1806. Alternatively, the biometric data can be passed to media/player recorder 1802 wirelessly. The data can be passed in analog or digital form, and is received and stored by media/player recorder 1802 according to the methods described above. In FIG. 18 the biometric sensor is worn on the leg. Of course, the biometric sensor can be worn in other locations. FIG. 21 show a biometric sensor 2104 worn on a finger and transmitting biometric data over a cable 2106.

According to these implementations, a user of the media player/recorder can record biometric data for later use in diagnosis and treatment of intermittently occurring medical conditions such as heart arrhythmia. When the user subsequently visits a doctor, the media player/recorder can transmit the stored biometric data to the doctor's computer for analysis, by wire or wirelessly.

Figure 22:
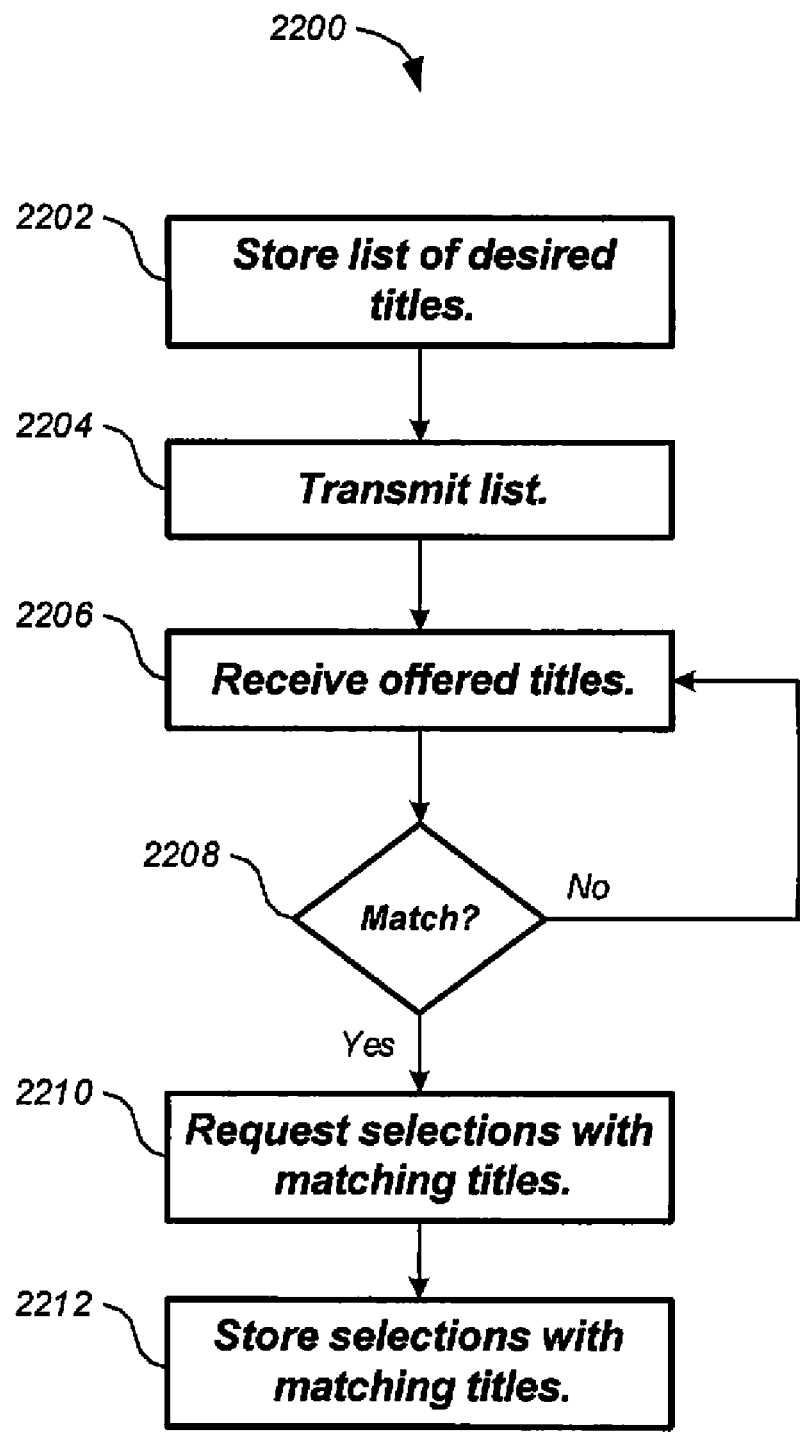
FIG. 22 shows a process for a media player/recorder to acquire shared media.
Figure 23:
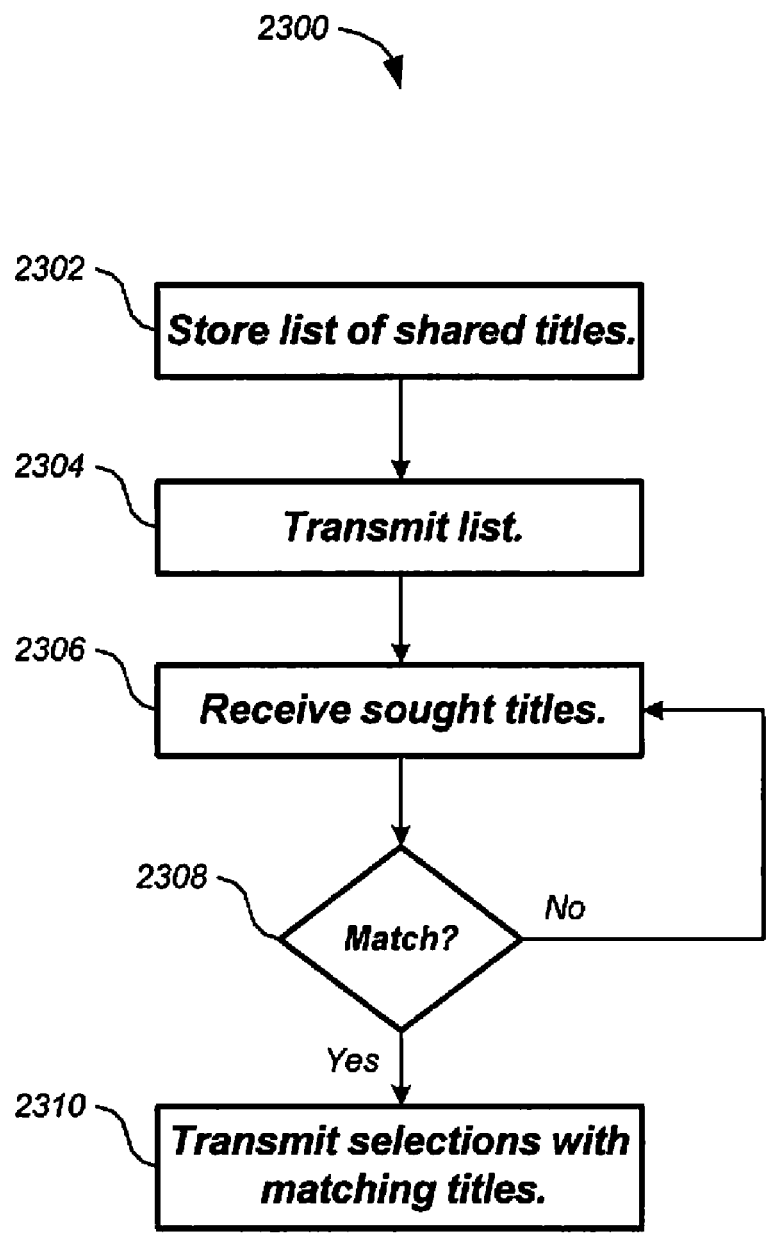
FIG. 23 shows a process for a media player/recorder to share media.

Some implementations feature a "share" mode in which media stored on one media player/recorder can be shared with other media player recorders using wireless data transmissions over wireless interface 210. FIGS. 22 and 23 show methods for such sharing. Of course, media can be shared over wired interface 206 as well using similar methods. However, these methods are well-suited for the relatively lower data rates of wireless links because they require little user intervention. These methods can be used not only to share media between player/recorder units, but also with other repositories of media, such as remote network servers and the like.

FIG. 22 shows a process 2200 for a media player/recorder to acquire shared media. A list of identifiers of desired media selections, such as song titles, is stored within the player/recorder (step 2202). A user can generate the list using the keypad, download the list from a computer, or the like. Optionally, the wireless transmitter can transmit a signal representing the list (step 2204). Other player/recorder units receive the list, and respond by offering media selections on the list. The wireless receiver receives the titles of the offered media selections (step 2206). The offered titles are compared to the desired titles (step 2208). The player/recorder optionally transmits a signal requesting the selections having matching titles (step 2210). Other player/recorders respond by transmitting the requested selections. The player/recorder receives the requested selections, and stores the received selections (step 2212).

The player/recorder can obtain selections shared by a broadcaster that simply transmits a title of a media selection, and then transmits the selection, without first waiting to receive lists of desired titles or requests for media selections having matching titles. In this case optional steps 2204 and 2210 are not needed.

FIG. 23 shows a process 2300 for a media player/recorder to share media. A list of identifiers of shared media selections, such as song titles, is stored within the player/recorder (step 2302). A user can generate the list using the keypad, download the list from a computer, or the like. Optionally, the wireless transmitter can transmit a signal representing the list (step 2304). Other player/recorder units receive the list, and respond by requesting media selections on the list. The wireless receiver receives the titles of the sought media selections (step 2306). The sought titles are compared to the shared titles (step 2308). The player/recorder transmits the selections having matching titles (step 2310).

Figure 24:
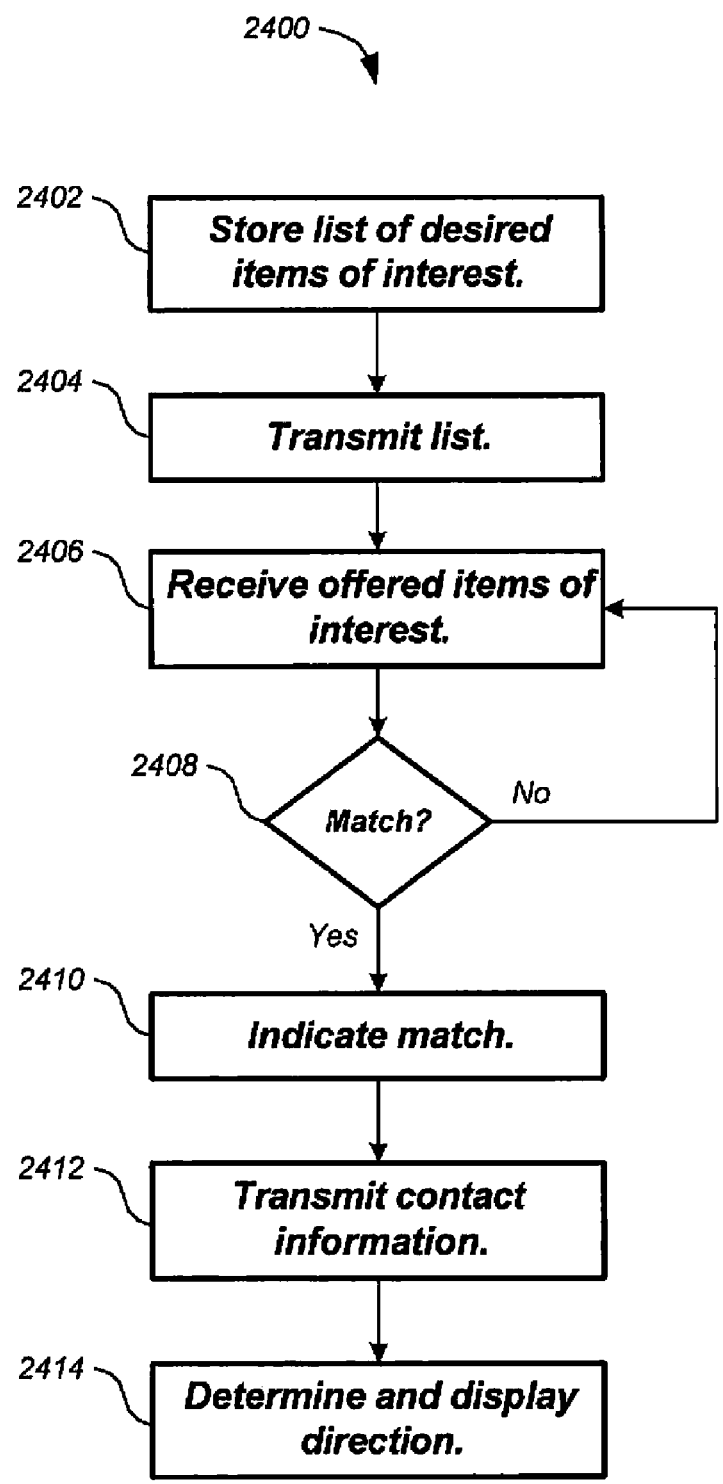
FIG. 24 shows a process for a media player/recorder to match items of interest.

Some implementations feature an "interest matching" mode in which items of interest stored on one media player/recorder can be shared with other media player recorders using wireless data transmissions over wireless interface 220. Items of interest include interests such as hobbies and sports, items for sale or rent, requests for items for sale or rent, musical preferences and the like. When a match is made, the display units indicate the match, and the media player/recorders can wirelessly exchange contact information such as email addresses, telephone numbers and the like. Some implementations include a directional antenna to allow the users having matched items of interest to locate each other. Of course, interests can be matched over wired interface 216 as well using similar methods. FIG. 24 shows methods for such interest matching.

FIG. 24 shows a process 2400 for a media player/recorder to match items of interest. A list of desired items of interest is stored within the player/recorder (step 2402). A user can generate the list using the keypad, download the list from a computer, or the like. Optionally, the wireless transmitter can transmit a signal representing the list (step 2404). The wireless receiver receives offered items of interest from other player/recorders (step 2406). The offered items of interest are compared to the desired items of interest (step 2408). When compared items of interest match, the display unit indicates a match (step 2410). Optionally the player/recorder transmits contact information to the transmitter of the offered item of interest (step 2412). Optionally, the player/recorder determines and displays a direction to the transmitter of the offered item of interest (step 2414). The player/recorder can also include a range finder circuit to determine a range to the transmitter of the offered item of interest, which is then displayed.

Figure 25:
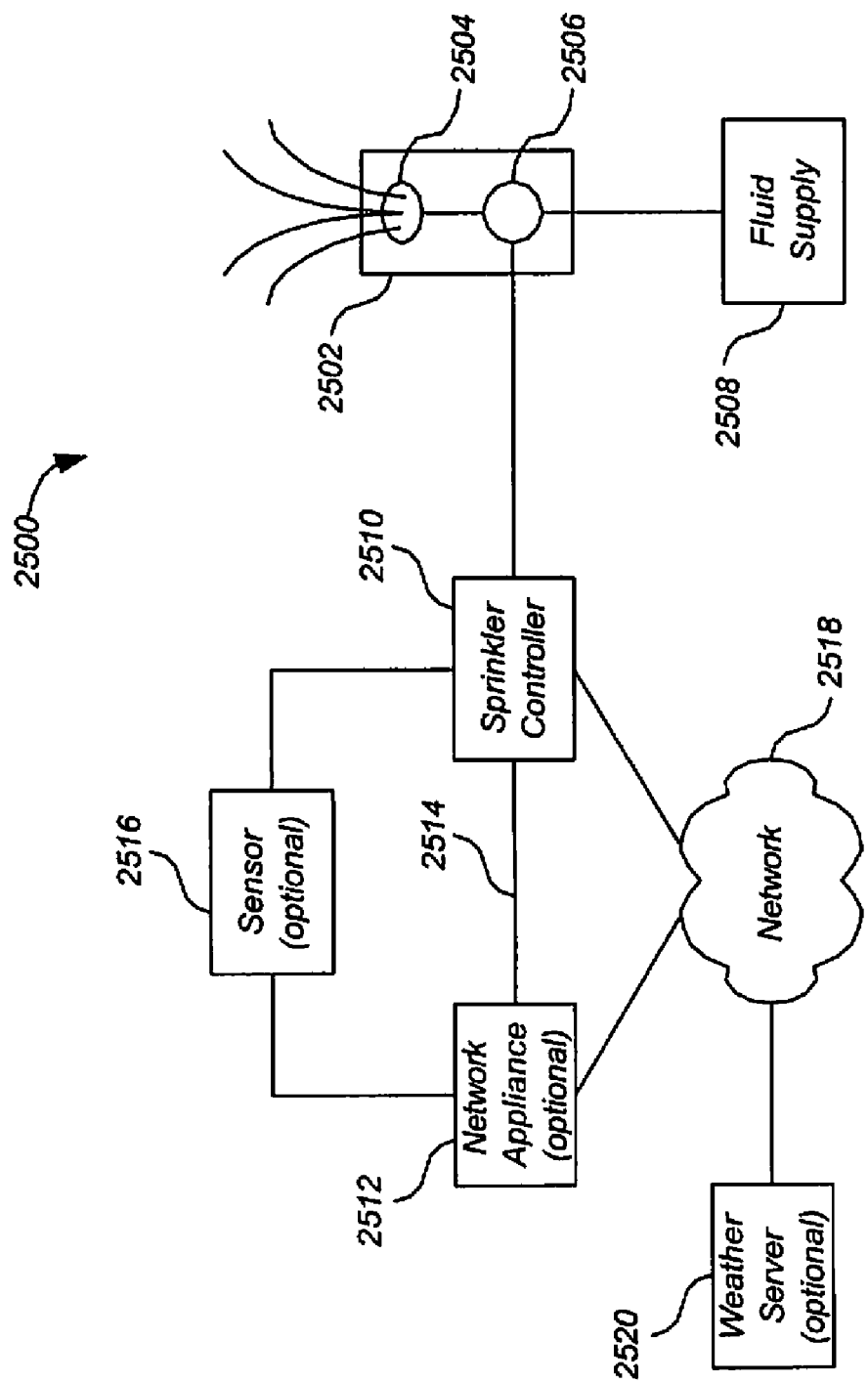
FIG. 25 shows a sprinkler system according to an embodiment of the present invention.

FIG. 25 shows a sprinkler system 2500 according to an embodiment of the present invention. Sprinkler system 2500 comprises one or more sprinklers 2502 each comprising a head 2504 and a valve 2506 that operates according to a sprinkler controller 2510 to deliver a fluid from a fluid supply 2508 to head 2504. Valve 2506 operates according to a control signal provided by a sprinkler controller 2510, which optionally communicates with an optional master unit such as a network appliance 2512, personal computer (PC) or the like over a channel 2514 that can be a wireless link or a wire, cable, or the like. An optional sensor 2516 detects conditions such as a pressure of the fluid, a flow rate of the fluid, ambient temperature, relative humidity, sunlight intensity and the like in the vicinity of sprinkler 2506. Sensor 2516 can provide this information to sprinkler controller 2510, to PC 2512, or to both. In some embodiments, sprinkler controller 2510 or network appliance 2512 communicate with a network 2518 such as the Internet, for example to obtain meteorological information from an optional weather server 2520. The pressure and flow rate of the fluid can be useful for setting valve 2506 to compensate for low fluid pressure, and for shutting off one or more valves 2506 in response to a break in a fluid line supplying the fluid, for example in the event of a broken sprinkler head 2504.

Sprinkler system 2500 has many uses including irrigation, fire suppression, and the like. A single sprinkler controller 2510 can control one or more sprinklers 2502, and can receive data from one or more sensors 2516, either directly or through PC 2512. Sprinkler controller 2510, sensors 2516, and sprinkler 2502 can be fabricated as separate units or as a single unit.

Sprinkler controller 2510 can operate independently or in conjunction with network appliance 2512. Network appliance 2512 can provide a variety of information to sprinkler controller 2510, which can generate a sprinkler schedule based on the information and subsequently generate sprinkler control signals based on the sprinkler schedule. For example, network appliance 2512 can provide information regarding current weather conditions, such as data gathered by sensors 2516 or provided by other remote sources such as Internet weather sites, information regarding future weather conditions such as forecast data provided by remote sources such as Internet weather sites, information regarding the status of fluid supply 2508 such as availability schedules and quantities, desired sprinkler operation schedules, and the like. In other embodiments, sprinkler controller 2510 can obtain this information directly from network 2518.

When operating independently, for example when the connection to network 2518 is unavailable, sprinkler controller 2510 can rely on data previously provided by network appliance 2512, data provided by sensors 2516, an internal timer which can be implemented as a processor, or any combination thereof, which can be stored in a memory in sprinkler controller 2510. In the absence of any information to be provided by network appliance 2512 or sensors 2516, sprinkler controller 2510 can rely on its internal timer and a default sprinkler schedule stored in a non-volatile memory in sprinkler controller 2510 to generate sprinkler control signals. In some embodiments, network appliance 2512 determines the operation schedule for sprinkler 2502. In other embodiments, sprinkler controller 2510 determines the operation schedule.

In embodiments including an optional display, sprinkler controller 2510 can display information such as the status of sprinkler controller 2510, the sprinkler schedule, and so on. In embodiments including an optional keypad, a user can operate the keypad to alter the operation of sprinkler controller 2510, for example by overriding its sprinkler schedule.

Figure 26:
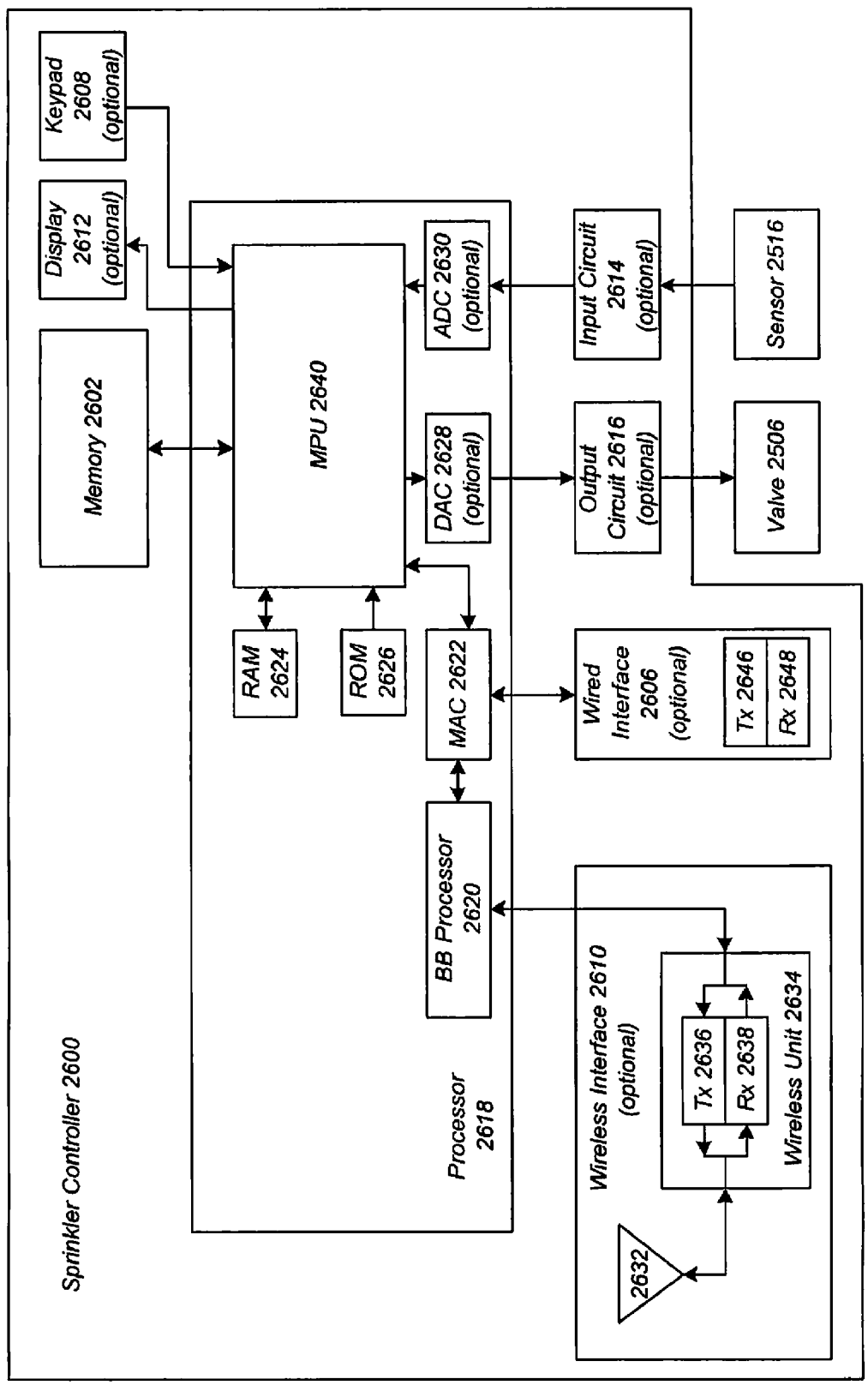
FIG. 26 shows a sprinkler controller according to an embodiment of the present invention.

FIG. 26 shows a sprinkler controller 2600 according to an embodiment of the present invention that can function as sprinkler controller 2510 of FIG. 25. Sprinkler controller 2600 includes a processor 2618 that includes a microprocessor unit (MPU) 2640, a volatile memory such as random access memory (RAM) 2624, a non-volatile memory such as read only memory (ROM) 2626, an optional digital to analog converter (DAC) 2628, an optional analog to digital converter (ADC) 2630, a media access controller (MAC) 2622, and a baseband processor 2620. Processor 2618 is preferably implemented as a single integrated circuit. A sprinkler controller having a processor implemented as a single integrated circuit can be fabricated at lower cost and have lower energy consumption. Alternatively, processor 2618 can be implemented by discrete components.

ROM 2626 stores programmed instructions for processor 2618 and MPU 2640 to control the operation of the signal processing of the media data. RAM 2626 is provided as a working memory for MPU 2640. Preferably.

Sprinkler controller 2600 also includes an interface, which can be a wired interface 2606, a wireless interface 2610, or a combination of the two. Sprinkler controller 2600 further includes a memory 2602, an optional input circuit 2614, an optional output circuit 2616, an optional keypad 2608, and an optional display 2612. Wireless interface 2610 includes a wireless antenna 2632 and a wireless unit 2610 that includes a wireless receiver 2638 and an optional wireless transmitter 2636. Wired interface 2606 includes a receiver 2646 and an optional transmitter 2648. Keypad 2608 can be fabricated together with display 2612 as a touch screen.

Memory 2602 comprises a solid state memory, such as, for example dynamic random access memory (solid state memory), flash memory, EEPROM, or the like. The amount of solid state memory supplied is selected to minimize energy consumption.

Antenna 2632 is a conventional antenna for receiving and transmitting wireless signals. Wireless unit 2610 converts wireless signals received by antenna 2632 to analog baseband signals, and converts analog baseband signals received from baseband processor 2620 to wireless signals for transmission by antenna 2632. Baseband processor 2620 converts analog baseband signals received from wireless unit 2610 to a digital bitstream, and converts a digital bitstream received from MAC 2622 to analog baseband signals, both according to well-known methods. MAC 2622 frames the digital bitstream produced by baseband processor 2620, and filters the frames to select the frames addressed to processor 2618, both according to well-known methods. MAC 2622 also converts frames received from processor 2618 to a digital bitstream for baseband processor 2620, also according to well-known methods. In some implementations, MAC 2622 includes an embedded microprocessor.

Digital data may be obtained (downloaded) from a personal computer, network appliance, local area network, Internet and the like, including wireless networks with infrastructure, such as a designated access point, peer-to-peer wireless networks, and the like. Such external devices communicate with the sprinkler controller via wired interface 2606 and/or wireless interface 2610, which are controlled by processor 2618. Wired interface 2606 may be implemented, for example, as a parallel interface, serial interface, USB, Ethernet connection, IEEE 1394 (a.k.a. Firewire), and the like. Wireless interface 2610 may be implemented, for example, as an infrared interface, IEEE 802.15, IEEE 802.11, Bluetooth™ and the like. Some embodiments of the present invention comply with one or more of the following standards: IEEE 802.11; IEEE 802.11a; IEEE 802.11b; IEEE 802.11g; IEEE 802.11h; and IEEE 802.11i. Again, the present invention is independent of the interface selected. The digital data is then optionally stored in memory 2602.

In some embodiments, wireless interface 2610 transmits and receives digital data using existing wireless infrastructure such as that provided for two-way pagers and mobile telephones. These technologies include Short Messaging Service (SMS) and Analog Display Service Interface (ADSI). SMS defines how messages are delivered to and from a wireless device, how the wireless device should store the messages, and processing which the wireless device can perform on the message.

ADSI was designed as an extension to interactive voice response systems. ADSI allows a service provider to send screens of data to a wireless device. A user can select options in the screens of data. The wireless device can transmit the user's selections using a special coding to describe the full alphanumeric character set.

Alternatively, digital data may be obtained from an external analog source such as an analog sensor 2816 connected to input circuit 2614. Input circuit 2614 takes the input signal from the external device and sets the analog signal to an appropriate level. The analog signal is then converted to a digital signal by ADC 2630. The digital data can be stored in memory 2602.

Figure 27:
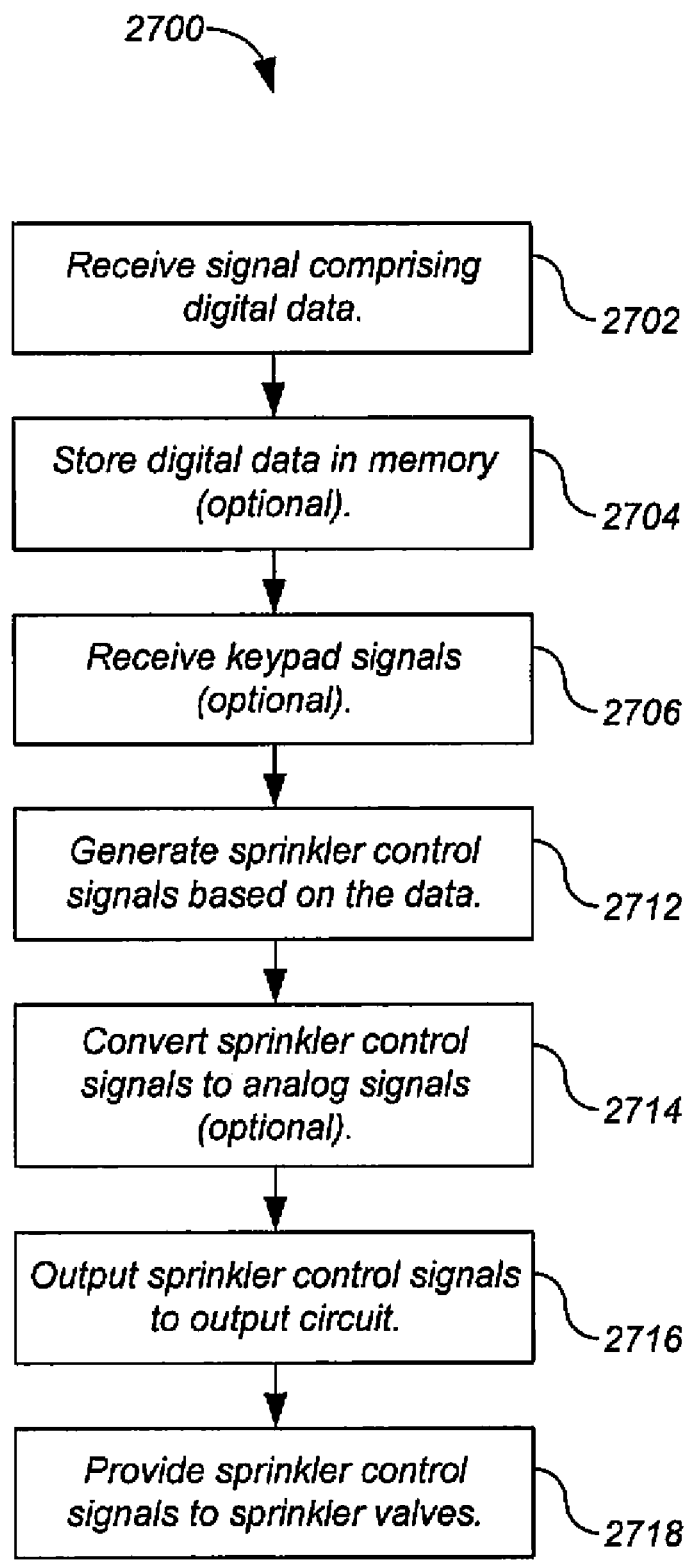
FIG. 27 shows a process that can be performed by the sprinkler controller of FIG. 26 according to a preferred embodiment.

FIG. 27 shows a process 2700 that can be performed by sprinkler controller 2600 according to a preferred embodiment. Operation of sprinkler controller 2600 can be automatic, controlled by the user through optional keypad 2608, which is in communication with MPU 2640, or both. Status of the sprinkler controller can be provided to the user by optional display 2612 in accordance with MPU 2640. When sprinkler controller 2600 is in communication with a personal computer, network appliance, local area network, Internet, or the like, encoded digital data such as described above is downloaded to sprinkler controller 2600 (step 2702). MPU 2640 controls the flow of data through interfaces 2606 and/or 2610 and optionally stores the encoded digital data in memory 2602 (step 2704).

In one embodiment the user enters control signals by way of optional keypad 2608 (step 2706). In another embodiment the user makes a selection by speaking the selection aloud. This sound is captured by input circuit 2614, and interpreted as a control signal.

Processor 2600 then generates one or more sprinkler control signals based on the data as described above (step 2712). The sprinkler control signals can be generated as analog signals or as digital signals, which can be converted to an analog signal by DAC 2628 (step 2714). The sprinkler control signals are output to output circuit 2616 (step 2716), which sets the analog signal to an appropriate level. Output circuit 2616 provides the analog control signal to one or more sprinkler valves 2506 (step 2718), which operate according to the sprinkler control signals.

Figure 28:
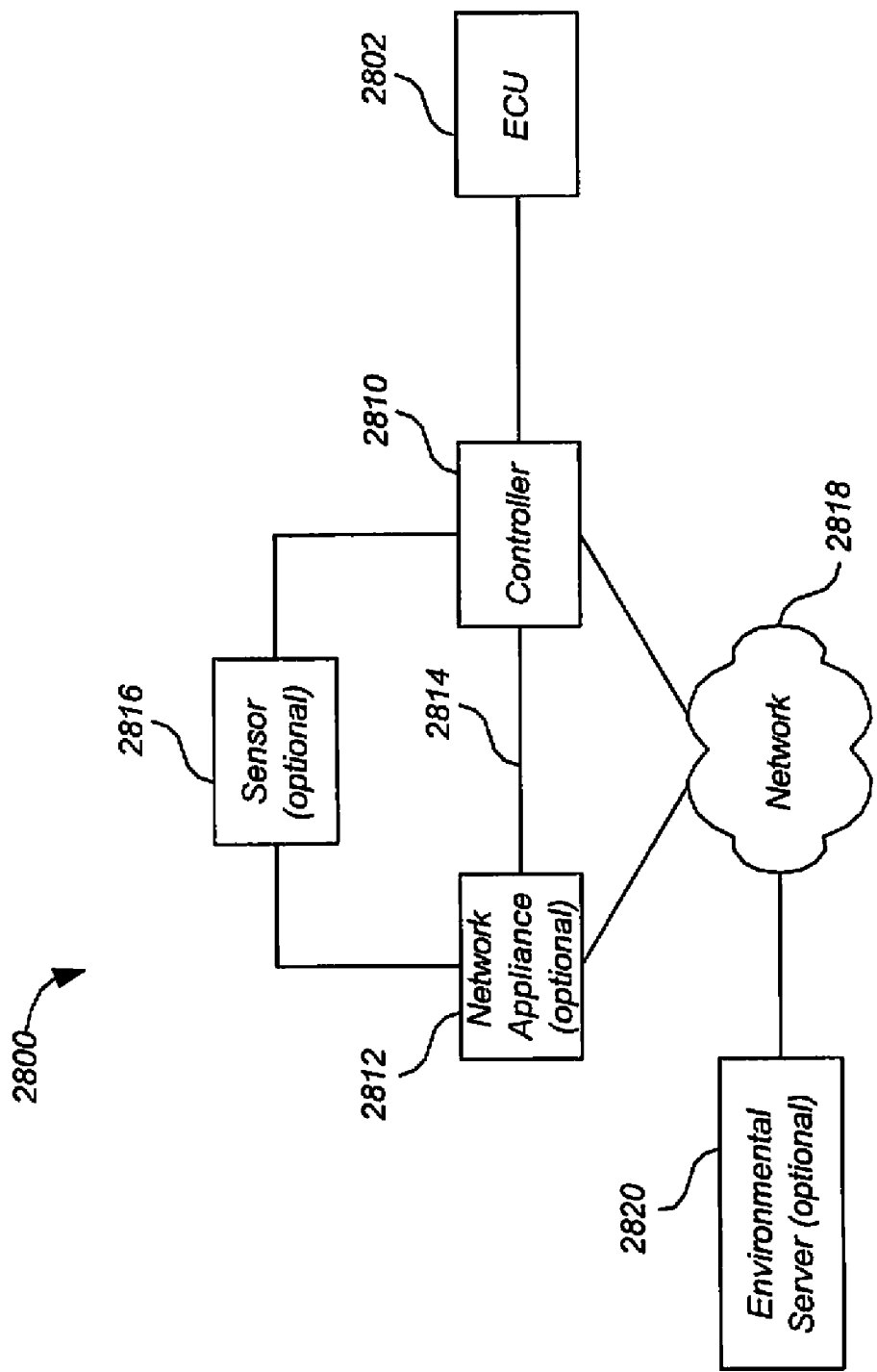
FIG. 28 shows an environmental control system according to an embodiment of the present invention.

FIG. 28 shows an environmental control system 2800 according to an embodiment of the present invention. Environmental control system 2800 comprises one or more environmental control units (ECU) 2802 that operate to control one or more environmental variables such as temperature, humidity, and the like according to a control signal provided by a controller 2810 such as a thermostat or the like, which communicates with an optional master unit such as a network appliance 2812, personal computer (PC) or the like over a channel 2814 that can be a wireless link or a wire, cable, or the like. A sensor 2816 detects environmental conditions such as ambient temperature, relative humidity, sunlight intensity and the like in the area affected by ECU 2802. Sensor 2816 can provide this information to thermostat 2810, to PC 2812, or to both. In some embodiments, controller 2810 or network appliance 2512 communicate with a network 2518 such as the Internet, for example to obtain environmental information from an optional environmental server 2520.

Environmental control units 2800 can be heaters, refrigeration units, humidifiers, air conditioners, and the like. A single controller 2810 can control one or more ECUs 2802, and can receive data from one or more sensors 2816, either directly or through PC 2812. Controller 2810, sensors 2816, and ECU 2802 can be fabricated as separate units or together in any combination.

Controller 2810 can operate independently or in conjunction with network appliance 2812. Network appliance 2812 can provide a variety of information to controller 2810, which can generate a ECU schedule based on the information and subsequently generate ECU control signals based on the ECU schedule. For example, network appliance 2812 can provide information regarding current weather conditions, such as data gathered by sensors 2816 or provided by other remote sources such as Internet weather sites, information regarding future weather conditions such as forecast data provided by remote sources such as Internet weather sites, information regarding the status of available power supplies to operate ECUs 2802, desired ECU operation schedules, and the like. In other embodiments, controller 2810 can obtain this information directly from network 2818.

When operating independently, for example when the connection to network 2818 is unavailable, controller 2810 can rely on data previously provided by network appliance 2812, data provided by sensors 2816, an internal timer which can be implemented as a processor, or any combination thereof, which can be stored in a memory in controller 2810. In the absence of any information to be provided by network appliance 2812 or sensors 2816, controller 2810 can rely on its internal timer and a default schedule stored in a non-volatile memory in controller 2810 to generate ECU control signals. In some embodiments, network appliance 2812 determines the operation schedule for ECU 2802. In other embodiments, controller 2810 determines the operation schedule.

In embodiments including an optional display, controller 2810 can display information such as the status of controller 2810, the ECU schedule, and so on. In embodiments including an optional keypad, a user can operate the keypad to alter the operation of controller 2810, for example by overriding its ECU schedule or temperature settings.

Figure 29:
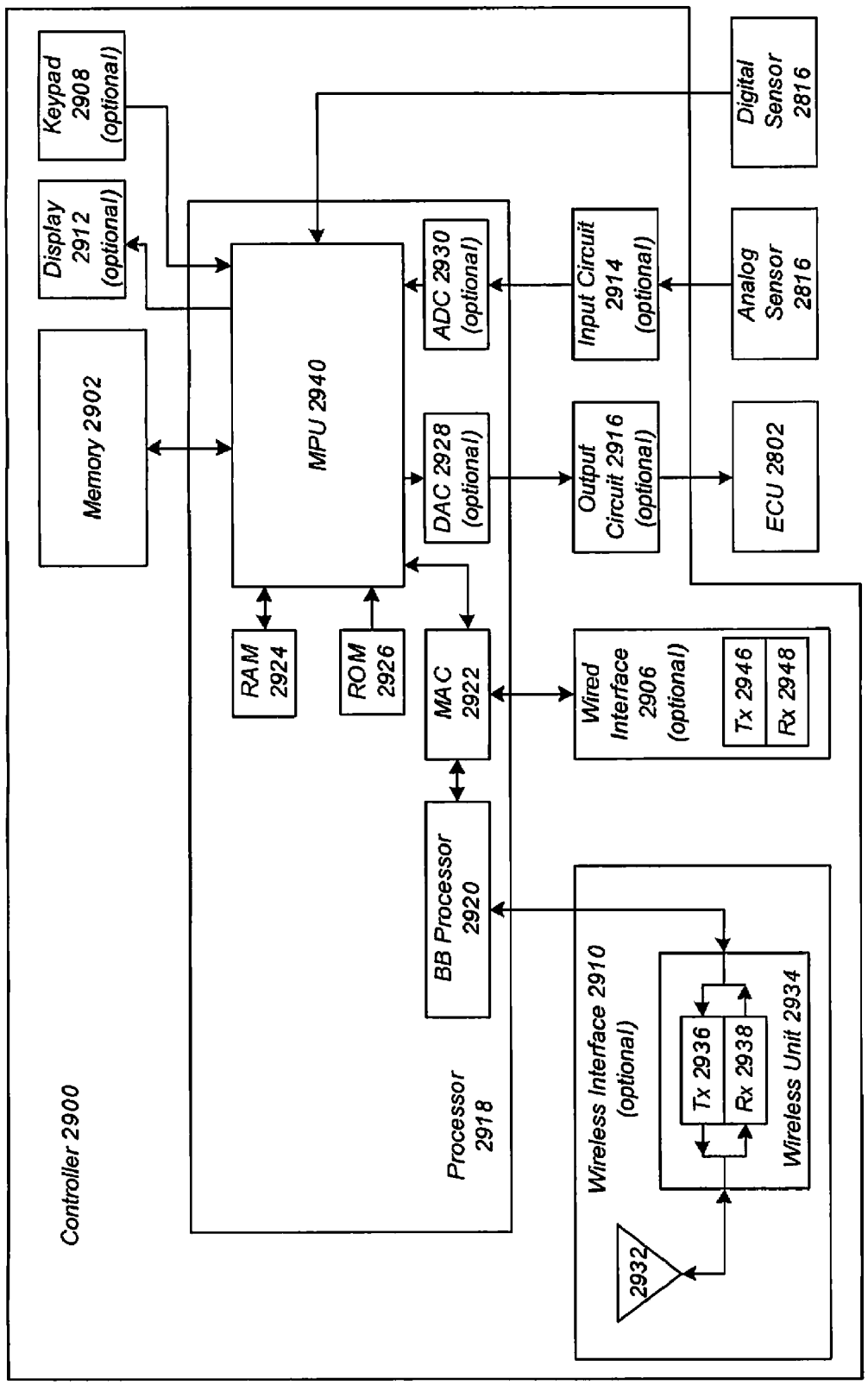
FIG. 29 shows a controller according to an embodiment of the present invention.

FIG. 29 shows a controller 2900 according to an embodiment of the present invention that can function as controller 2810 of FIG. 28. Controller 2900 includes a processor 2918 that includes a microprocessor unit (MPU) 2940, a volatile memory such as random access memory (RAM) 2924, a non-volatile memory such as read only memory (ROM) 2926, an optional digital to analog converter (DAC) 2928, an optional analog to digital converter (ADC) 2930, a media access controller (MAC) 2922, and a baseband processor 2920. Processor 2918 is preferably implemented as a single integrated circuit. A controller having a processor implemented as a single integrated circuit can be fabricated at lower cost and have lower energy consumption. Alternatively, processor 2918 can be implemented by discrete components.

ROM 2926 stores programmed instructions for processor 2918 and MPU 2940 to control the operation of the signal processing of the media data. RAM 2926 is provided as a working memory for MPU 2940.

Controller 2900 also includes an interface, which can be a wired interface 2906, a wireless interface 2910, or a combination of the two. Controller 2900 further includes a memory 2902, an optional input circuit 2914, an optional output circuit 2916, an optional keypad 2908, and an optional display 2912. Wireless interface 2910 includes a wireless antenna 2932 and a wireless unit 2910 that includes a wireless receiver 2938 and an optional wireless transmitter 2936. Wired interface 2906 includes a receiver 2946 and an optional transmitter 2948. Keypad 2908 can be fabricated together with display 2912 as a touch screen.

Memory 2902 comprises a solid state memory, such as, for example dynamic random access memory (solid state memory), flash memory, EEPROM, or the like. The amount of solid state memory supplied is selected to minimize energy consumption.

Antenna 2932 is a conventional antenna for receiving and transmitting wireless signals. Wireless unit 2910 converts wireless signals received by antenna 2932 to analog baseband signals, and converts analog baseband signals received from baseband processor 2920 to wireless signals for transmission by antenna 2932. Baseband processor 2920 converts analog baseband signals received from wireless unit 2910 to a digital bitstream, and converts a digital bitstream received from MAC 2922 to analog baseband signals, both according to well-known methods. MAC 2922 frames the digital bitstream produced by baseband processor 2920, and filters the frames to select the frames addressed to processor 2918, both according to well-known methods. MAC 2922 also converts frames received from processor 2918 to a digital bitstream for baseband processor 2920, also according to well-known methods. In some implementations, MAC 2922 includes an embedded microprocessor.

Digital data may be obtained (downloaded) from a personal computer, network appliance, local area network, Internet and the like, including wireless networks with infrastructure, such as a designated access point, peer-to-peer wireless networks, and the like. Such external devices communicate with the controller via wired interface 2906 and/or wireless interface 2910, which are controlled by processor 2918. Wired interface 2906 may be implemented, for example, as a parallel interface, serial interface, USB, Ethernet connection, IEEE 1394 (a.k.a. Firewire), and the like. Wireless interface 2910 may be implemented, for example, as an infrared interface, IEEE 802.15, IEEE 802.11, Bluetooth™ and the like. Some embodiments of the present invention comply with one or more of the following standards: IEEE 802.11; IEEE 802.11a; IEEE 802.11b; IEEE 802.11g; IEEE 802.11h; and IEEE 802.11i. Again, the present invention is independent of the interface selected. The digital data is then optionally stored in memory 2902. Processor 2918 can obtain digital data directly from a digital sensor 2816, or indirectly over wired interface 2906 or wireless interface 2910.

In some embodiments, wireless interface 2910 transmits and receives digital data using existing wireless infrastructure such as that provided for two-way pagers and mobile telephones. These technologies include Short Messaging Service (SMS) and Analog Display Service Interface (ADSI). SMS defines how messages are delivered to and from a wireless device, how the wireless device should store the messages, and processing which the wireless device can perform on the message.

ADSI was designed as an extension to interactive voice response systems. ADSI allows a service provider to send screens of data to a wireless device. A user can select options in the screens of data. The wireless device can transmit the user's selections using a special coding to describe the full alphanumeric character set.

Figure 30:
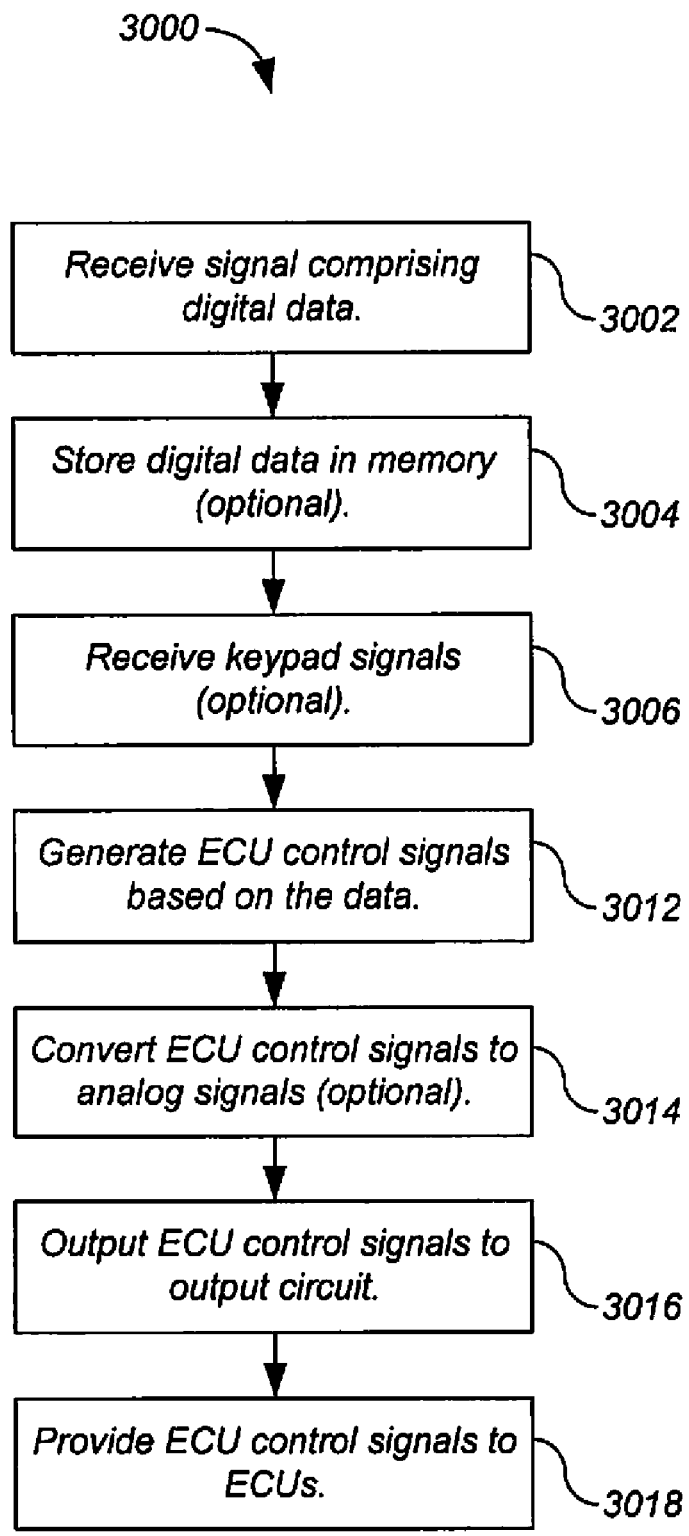
FIG. 30 shows a process that can be performed by the controller of FIG. 29 according to a preferred embodiment.

FIG. 30 shows a process 3000 that can be performed by controller 2900 according to a preferred embodiment. Operation of controller 2900 can be automatic, controlled by the user through optional keypad 2908, which is in communication with MPU 2940, or both. Status of the controller can be provided to the user by optional display 2912 in accordance with MPU 2940. When controller 2900 is in communication with a personal computer, network appliance, local area network, Internet, or the like, encoded digital data such as described above is downloaded to controller 2900 (step 3002). MPU 2940 controls the flow of data through interfaces 2906 and/or 2910 and optionally stores the encoded digital data in memory 2902 (step 3004).

In one embodiment the user enters control signals by way of optional keypad 2908 (step 3006). In another embodiment the user makes a selection by speaking the selection aloud. This sound is captured by input circuit 2914, and interpreted as a control signal.

Processor 2900 then generates one or more ECU control signals based on the data as described above (step 3012). The ECU control signals can be generated as analog signals or as digital signals, which can be converted to an analog signal by DAC 2928 (step 3014). The ECU control signals are output to output circuit 2916 (step 3016), which sets the analog signal to an appropriate level. Output circuit 216 provides the ECU control signal to one or more ECUs 2802 (step 3018).

While an embodiment of environmental control system 2800 is described in terms of a controller regulating an air conditioner or the like based on temperature or the like, other embodiments use other sorts of controllers to regulate other sorts of environmental control units based on temperature and/or other factors.

Figure 31:
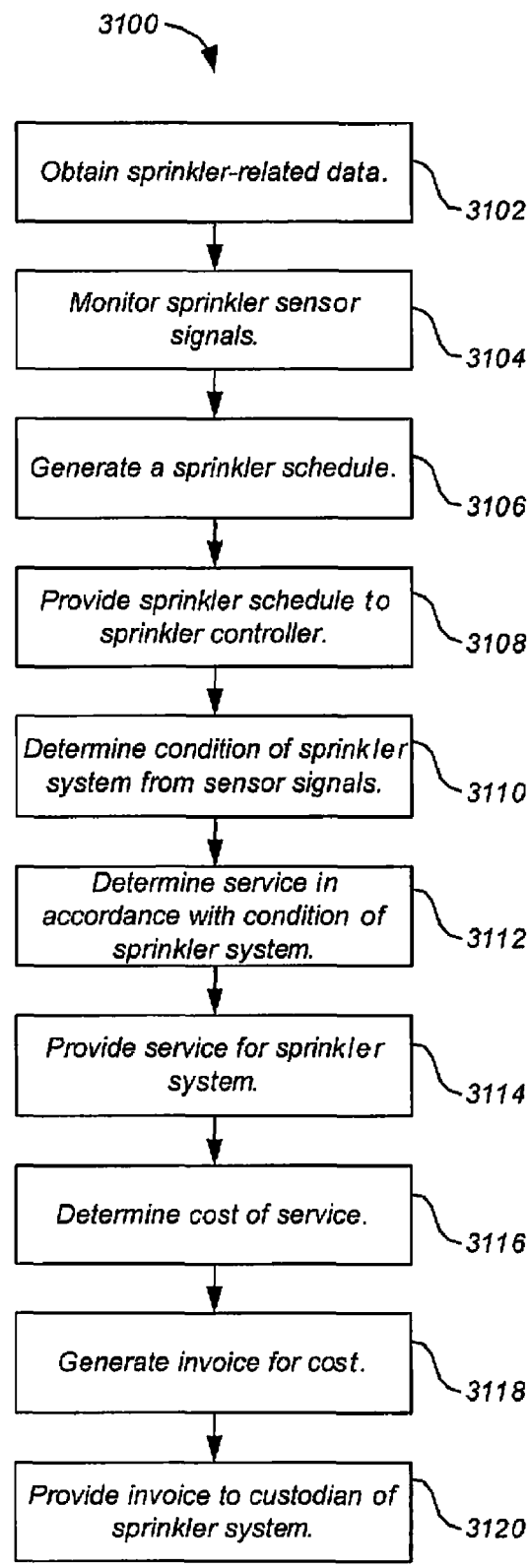
FIG. 31 shows a method performed by a service provider according to a preferred embodiment.

Referring again to FIG. 25, in one embodiment, sprinkler controller 2510 communicates with a service provider that provides services such as sprinkler information and maintenance. FIG. 31 shows a method 3100 performed by the service provider according to a preferred embodiment.

The service provider obtains sprinkler-related data that can be used to generate a sprinkler schedule (step 3102). This data can include, for example, meteorological conditions, and a status of a fluid supply system supplying the fluid to the sprinklers.

The service provider also monitors the sensor signals provided by one or more of the sensors 2516 in sprinkler system 2500 (step 3104). Recall the sensor signals represent a condition of the sprinkler system. For example, the sensor signals can represent a pressure of the fluid supplied to the sprinklers. As another example, the sensor signals can represent a flow rate of the fluid supplied to the sprinklers. The sensor signals can be provided over network 2518 by sprinkler controller 2510, by optional network appliance 2512, or directly by sensors 2516.

The service provider generates a sprinkler schedule for sprinkler system 2500 based on one or both of the data obtained in steps 3102 and 3104 (step 3106), and provides the sprinkler schedule to the sprinkler controller 2510 (step 3108), for example using wireless interface 2610.

The service provider also determines the condition of the sprinkler system from the sensor signal (step 3110), and determines a service for the sprinkler system in accordance with the condition of the sprinkler system (step 3112). For example, if the fluid pressure is very low, and the fluid flow rate is very high, the service provider may determine that the sprinkler system has a leak, and therefore may determine that it is necessary to interrupt the flow of the fluid supplied to the sprinkler system, and to dispatch a repair technician to the site of the leak to repair one or more of the sprinklers, or to repair a supply line providing the fluid to the sprinklers. The service provider then provides the service for the sprinkler system (step 3114).

The service provider may invoice the sprinkler system custodian on a regular basis for monitoring the sprinkler system, and may invoice for each service provided. For example, after providing the service to the sprinkler system, the service provider determines a cost of the service (step 3116), generates an invoice for the cost of the service (step 3118), and provides the invoice to the custodian of the sprinkler system (step 3120).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Neverthe-less, it will be understood that various modifications may be made without departing from the spirit and scope of the invention. Accordingly, other implementations are within the scope of the following claims.

What is claimed is:

1. A sprinkler system comprising:
a fluid supply; and
one or more sprinklers configured to deliver fluid from the fluid supply, wherein each sprinkler of the one or more sprinklers includes
a wireless interface configured to receive information over a wireless channel,
a processor configured to (i) generate a schedule for operating the sprinkler based on the information received by the wireless interface and (ii) generate a control signal for controlling the sprinkler based on the schedule, and
a valve configured to regulate an amount of the fluid delivered by the sprinkler in response to the control signal,
wherein each of the wireless interface, the processor, and the valve are fabricated as part of the sprinkler as a single unit.

2. The sprinkler system of claim 1, wherein the information comprises one or more of: information regarding current weather conditions, information regarding forecasted weather conditions, or information regarding a status of the fluid supply.

3. The sprinkler system of claim 1, wherein each sprinkler of the one or more sprinklers is configured to operate independently of other sprinklers.

4. The sprinkler system of claim 1, wherein:
each sprinkler further comprises a sensor configured to detect a flow rate of the fluid delivered by the sprinkler; and
the processor is configured to generate the control signal further based on the flow rate of the fluid delivered by the sprinkler as detected by the sensor.

5. The sprinkler system of claim 1, wherein the wireless interface is implemented in accordance with one or more of the following wireless protocols: IEEE 802.15, IEEE 802.11, or Bluetooth.

6. The sprinkler system of claim 1, wherein the wireless interface is an infrared interface.

* * * * *